(12) United States Patent
Seki et al.

(10) Patent No.: US 11,456,490 B2
(45) Date of Patent: Sep. 27, 2022

(54) SECONDARY BATTERY, BATTERY PACK, VEHICLE, AND STATIONARY POWER SUPPLY

(71) Applicant: Kabushiki Kaisha Toshiba, Minato-ku (JP)

(72) Inventors: Hayato Seki, Kawasaki (JP); Wataru Uno, Yokohama (JP); Yasuyuki Hotta, Ota (JP); Shinsuke Matsuno, Minato (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 170 days.

(21) Appl. No.: 16/897,665

(22) Filed: Jun. 10, 2020

(65) Prior Publication Data

US 2021/0091416 A1    Mar. 25, 2021

(30) Foreign Application Priority Data

Sep. 19, 2019  (JP) .............................. JP2019-170917
Apr. 14, 2020  (JP) .............................. JP2020-072134

(51) Int. Cl.
*H01M 10/36*     (2010.01)
*H01M 4/48*      (2010.01)
(Continued)

(52) U.S. Cl.
CPC ............. *H01M 10/36* (2013.01); *H01M 4/48* (2013.01); *H01M 4/485* (2013.01); *H01M 10/425* (2013.01); *H01M 2004/027* (2013.01); *H01M 2010/4271* (2013.01); *H01M 2300/0002* (2013.01)

(58) Field of Classification Search
CPC ........ H01M 10/36; H01M 4/42; H01M 4/425; H01M 4/48; H01M 4/485
See application file for complete search history.

(56) References Cited

U.S. PATENT DOCUMENTS 4,074,028 A      2/1978  Will
2018/0269537 A1  9/2018  Yoshima et al.
(Continued)

FOREIGN PATENT DOCUMENTS

EP   3 392 925 A1   10/2018
EP   3 422 463 A1   1/2019
(Continued)

OTHER PUBLICATIONS

U.S. Appl. No. 16/551,098, filed Aug. 26, 201, Hayato Seki, et al.

*Primary Examiner* — Karie O'Neill Apicella
(74) *Attorney, Agent, or Firm* — Oblon, McClelland, Maier & Neustadt, L.L.P.

(57) ABSTRACT

A secondary battery includes a positive electrode, a first aqueous electrolyte held on the positive electrode, a negative electrode, a second aqueous electrolyte held on the negative electrode, and a separator interposed between the positive electrode and the negative electrode. A difference between an osmotic pressure (N/m$^2$) of the first aqueous electrolyte and an osmotic pressure (N/m$^2$) of the second aqueous electrolyte is 90% or less (including 0%) of the higher one of the osmotic pressure of the first aqueous electrolyte and the osmotic pressure of the second aqueous electrolyte.

13 Claims, 7 Drawing Sheets

(51) Int. Cl.
*H01M 4/485* (2010.01)
*H01M 10/42* (2006.01)
*H01M 4/02* (2006.01)

(56) References Cited

U.S. PATENT DOCUMENTS

| | | |
|---|---|---|
| 2018/0277813 A1 | 9/2018 | Yoshima et al. |
| 2018/0277885 A1 | 9/2018 | Takami et al. |
| 2018/0277899 A1 | 9/2018 | Takami et al. |
| 2019/0288332 A1 | 9/2019 | Hotta et al. |
| 2019/0296325 A1 | 9/2019 | Sekiguchl et al. |
| 2020/0295334 A1* | 9/2020 | Seki .................... H01M 50/46 |

FOREIGN PATENT DOCUMENTS

| | | |
|---|---|---|
| JP | 6383038 B1 | 8/2018 |
| JP | 2018-160443 A | 10/2018 |
| JP | 2019-160748 A | 9/2019 |
| JP | 2019-169355 A | 10/2019 |

\* cited by examiner

SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2019-170917 filed on Sep. 19, 2019 and Japanese Patent Application No. 2020-072134 filed on Apr. 14, 2020, and the entire contents of which are incorporated herein by reference.

FIELD

Embodiments relate generally to a secondary battery, a battery pack, a vehicle, and a stationary power supply.

BACKGROUND

A nonaqueous electrolyte battery in which a carbon material or lithium titanium oxide is used as a negative electrode active material, and a layered oxide containing nickel, cobalt, manganese is used as a positive electrode active material, in particular, a secondary battery, has already been practically used as a power supply in a wide range of fields.

On the other hand, many organic solvents are flammable substances, and thus, in principle, the safety of the secondary battery is likely to be inferior to a secondary battery using an aqueous solution. Although various measures are taken to improve the safety of the secondary battery using an organic solvent-based electrolyte, these measures are not necessarily sufficient. In addition, for a nonaqueous secondary battery, a dry environment is required in a production process, and thus the production cost is inevitably increased. Furthermore, the organic solvent-based electrolyte has inferior conductivity, and thus an internal resistance of the nonaqueous secondary battery is likely to be increased. Such problems cause a large defect on an electric automobile or a hybrid electric automobile and a large-sized storage battery for power storage, where emphasis is on the battery safety and the battery cost.

In order to solve the problems of the nonaqueous secondary battery, a secondary battery using an aqueous electrolyte has been proposed. For the aqueous electrolyte, it is necessary that a potential range in which charging and discharging of a battery is performed is within a potential range in which an electrolysis reaction of water contained as a solvent does not occur.

In order to obtain a sufficient electromotive force, even in a case where the positive electrode active material and the negative electrode active material are appropriately combined, in the aqueous electrolyte, a potential of lithium insertion and extraction of lithium titanium oxide is about 1.5 V (vs. Li/Li$^+$) based on a lithium potential, and thus electrolysis of the aqueous electrolyte is likely to occur, and the active material can be easily separated from a current collector due to this influence. Therefore, such a battery does not operate stably, and it is not possible to perform a satisfactory charging and discharging.

The electrolysis of a water solvent can be avoided by using, for example, lithium manganese oxide as a positive electrode active material and lithium vanadium oxide as a negative electrode active material. In the combination of these materials, although an electromotive force of about 1 to 1.5 V is obtained, it is difficult to obtain a sufficient energy density for a battery.

In a conventional technology, it is possible to provide a lithium secondary battery that contains zinc in a current collector so as to have a sufficient energy density, and is inexpensive and highly safe. However, there has been room for improvement in terms of a storage performance and cycle characteristics.

DETAILED DESCRIPTION

Figure 1:
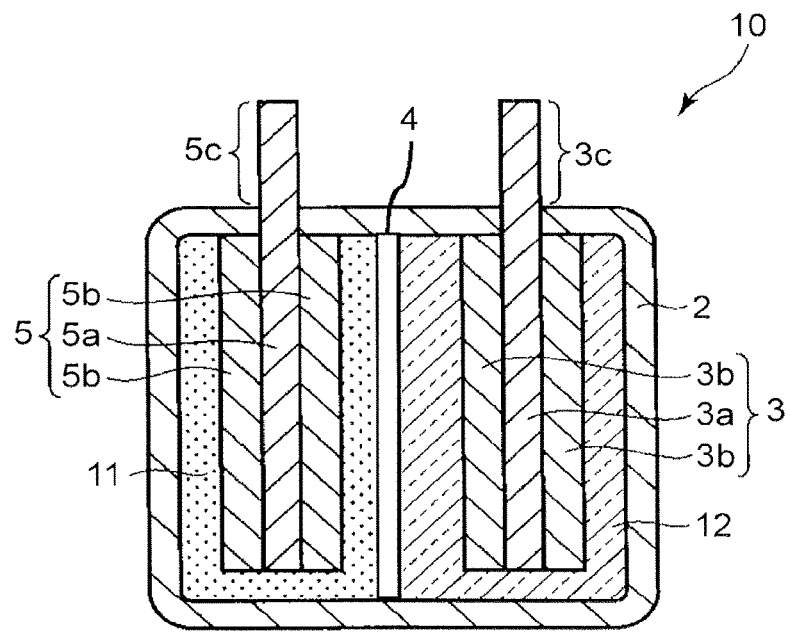
FIG. 1 is a cross-sectional view schematically illustrating an example of a secondary battery according to a first embodiment.

Hereinafter, embodiments will be described with reference to the drawings. Note that the same reference numerals are given to common configurations throughout the embodiments, and redundant descriptions are omitted. In addition, each drawing is a schematic view for describing the embodiment and facilitating the understanding thereof, and there are differences in shape, dimension, ratio, and the like from an actual device. However, these can be appropriately designed and changed by considering the following description and known technology. In the following description, pH indicates a value at 25° C. and 1 atmospheric pressure (air), unless otherwise specified.

First Embodiment

A secondary battery according to a first embodiment includes a positive electrode, a first aqueous electrolyte held on the positive electrode, a negative electrode, a second aqueous electrolyte held on the negative electrode, and a separator interposed between the positive electrode and the negative electrode. A difference between an osmotic pressure (N/m$^2$) of the first aqueous electrolyte and an osmotic pressure (N/m) of the second aqueous electrolyte is 90% or less of the higher one of the osmotic pressure of the first aqueous electrolyte and the osmotic pressure of the second aqueous electrolyte. For example, a case in which an aqueous electrolyte having the lower osmotic pressure is the first aqueous electrolyte, and an aqueous electrolyte having the higher osmotic pressure is the second aqueous electrolyte can be represented by ((absolute value of difference between osmotic pressure of first aqueous electrolyte and osmotic pressure of second aqueous electrolyte)/(osmotic pressure of second aqueous electrolyte))×100%.

The secondary battery according to the present embodiment may further include a compound capable of regulating an osmotic pressure. The compound capable of regulating an osmotic pressure may be described as an osmotic pressure regulator (osmotic pressure regulating agent) for convenience. A specific example of the compound capable of regulating an osmotic pressure will be described below. By using the compound capable of regulating an osmotic pressure, concentrations of the first aqueous electrolyte and the second aqueous electrolyte can be adjusted, the difference between the osmotic pressure of the first aqueous electrolyte and the osmotic pressure of second aqueous electrolyte can be reduced, and the first aqueous electrolyte and the second aqueous electrolyte can be prevented from being mixed. When the aqueous electrolytes can be prevented from being mixed, the cycle characteristics of the secondary battery can be improved.

Specifically, in a case where an aqueous electrolyte is used, electrolysis of water tends to occur as a side reaction of the aqueous electrolyte. In the electrolysis of water, a chemical reaction represented by Equation (1) is generated in the negative electrode, and a chemical reaction represented by Equation (2) is generated in the positive electrode.

$$2H^+ + 2e^- \rightarrow H_2 \quad (1)$$

$$2O^{2-} \rightarrow O_2 + 2e^- \quad (2)$$

In addition, a potential window in which decomposition by an oxidation reaction is not generated, and a potential window in which decomposition by a reduction reaction is not generated exist in an oxidation-reduction reaction of the aqueous electrolyte such as electrolysis of water. For example, in the electrolysis of water, from the Nernst equation, when a relationship represented by Expression (3) is established for a potential E1 of the negative electrode, hydrogen in the negative electrode is easily generated by the reduction reaction. In addition, for a potential E2 of the positive electrode, when a relationship represented by Expression (4) is established, oxygen in the positive electrode is easily generated by the oxidation reaction. Here, in Expressions (3) and (4), a pH indicates a pH of the aqueous electrolyte.

$$E1 < -0.059 \times pH \quad (3)$$

$$E2 > 1.23 - 0.059 \times pH \quad (4)$$

From Expressions (3) and (4), in a case where the aqueous electrolyte is not separated into a negative electrode side and a positive electrode side, when a voltage between the negative electrode and the positive electrode is higher than 1.23 V regardless of the pH of the aqueous electrolyte, thermodynamic electrolysis of water is likely to occur. Even in a case where a separator having a low permeability is used, when a movement of the aqueous electrolyte is completely prevented, a movement of cations is also prevented, and thus a performance of the secondary battery is reduced.

In addition, when a lithium salt concentration in the aqueous electrolyte of the negative electrode is different from that of the aqueous electrolyte of the positive electrode, the movement of water is more likely to occur, and thus a reaction represented by the above equation is generated. Accordingly, the performance of the secondary battery is likely to be reduced.

Therefore, in order to suppress the movement of the aqueous electrolyte, at least one of the first aqueous electrolyte and the second aqueous electrolyte contains an osmotic pressure regulator so as to make a difference in osmotic pressure between the first aqueous electrolyte and the second aqueous electrolyte be 90% or less (including 0%) of the higher one of the osmotic pressure of the first aqueous electrolyte and the osmotic pressure of the second aqueous electrolyte, such that the movement of the aqueous electrolyte can be suppressed, and thus the electrolysis of water can be suppressed. When the difference in osmotic pressure is more than 90% of the higher osmotic pressure, the aqueous electrolytes of the positive electrode and the negative electrode are excessively mixed with each other by an osmotic pressure, which is not preferable. The osmotic pressure regulator may contains at least one of an inorganic compound, an organic compound, and a surfactant.

In addition, a salt concentration in either the first aqueous electrolyte or the second aqueous electrolyte is increased due to the movement of the aqueous electrolyte, and thus the precipitation of the salt at the electrode can be suppressed. By making the secondary battery have such a configuration, an increase in a resistance due to the salt precipitation and capacity deterioration at the time of a long term cycle test can be suppressed, and a storage performance can be improved. By improving the storage performance, a coulombic efficiency can be improved. This is because that the coulombic efficiency indicates a slope of self-discharge. Therefore, the higher the coulombic efficiency, the better the storage performance.

Furthermore, when the difference in osmotic pressure between the first aqueous electrolyte and the second aqueous electrolyte is 80% or less of the higher one of the osmotic pressure of the first aqueous electrolyte and the osmotic pressure of the second aqueous electrolyte, the mixing of the aqueous electrolytes of the positive electrode and the negative electrode due to the difference in osmotic pressure can be kinetically sufficiently suppressed, which is more preferable.

The difference in osmotic pressure is more preferably 50% or less. Within this range, since the mixing of the aqueous electrolytes due to the osmotic pressure can be suppressed for a long period of time, the storage performance can be improved, and the coulombic efficiency can thus be improved. Furthermore, a cycle life can be significantly increased.

When the difference in osmotic pressure between the first aqueous electrolyte and the second aqueous electrolyte is 90% or less of the higher one of the osmotic pressure of the first aqueous electrolyte and the osmotic pressure of the second aqueous electrolyte, it is possible to use an aqueous electrolyte of the positive electrode side and an aqueous electrolyte of the negative electrode side different in pH or type. Here, by using an aqueous electrolyte having a pH lower than that of the aqueous electrolyte of the negative electrode side as the aqueous electrolyte of the positive electrode side, the electrolysis of water is less likely to occur even when a voltage between the negative electrode and the positive electrode is higher than 1.23 V. For example, it is considered that in a case where an aqueous electrolyte having a pH of 1 is used as the aqueous electrolyte of the positive electrode side, and an aqueous electrolyte having a pH of 14 is used as the aqueous electrolyte of the negative electrode side, unless the voltage between the negative electrode and the positive electrode is increased to about 2 V, the electrolysis of water is less likely to occur.

Materials for the respective member that can be used in a secondary battery according to a first embodiment will be described in detail.

(Aqueous Electrolyte)

Examples of the aqueous electrolyte can include an aqueous electrolytic solution containing an aqueous solvent and a first electrolyte and an aqueous electrolyte in a gel state obtained by compositing a polymer material with this aqueous electrolytic solution. In order to distinguish an aqueous electrolyte used for collectively referring to the aqueous electrolytic solution and the aqueous electrolyte in a gel state from an electrolyte as a solute, the electrolyte as the solute is referred to as a first electrolyte for convenience. Examples of the polymer material can include polyvinylidene fluoride (PVdF), polyacrylonitrile (PAN), and polyethylene oxide (PEO). The aqueous electrolyte contains at least one anion selected from the group consisting of $NO_3^-$, $Cl^-$, $LiSO_4^-$, $SO_4^{2-}$, and $OH^-$. One kind of anion or two or more kinds of anions may be contained in the aqueous electrolyte.

As the aqueous solvent, a solution containing water can be used. Here, the solution containing water may be pure water, or may be a mixed solution or a mixed solvent of water and substances other than water.

In the aqueous electrolyte, the amount of water solvent (for example, the amount of water in the aqueous solvent) is preferably 1 mol or more with respect to 1 mol of a salt used as a solute. The amount of the water solvent is more preferably 3.5 mol or more with respect to 1 mol of a salt used as a solute.

As the first electrolyte, it is possible to use a substance that dissociates and generates the anions when the substance is dissolved in an aqueous solvent. In particular, it is preferable to use a lithium salt that dissociates into Li ion and the above anion. Examples of the lithium salt can include $LiNO_3$, $LiCl$, $Li_2SO_4$, and $LiOH$.

In addition, the lithium salt that dissociates into Li ion and the anion has a relatively high solubility in the aqueous solvent. Therefore, it is possible to obtain an aqueous electrolyte having a high anion concentration of 1 to 10 M and having an excellent Li ion diffusibility.

An electrolyte containing $NO^{3-}$ and/or $Cl^-$ can be used in a wide range of the anion concentration of about 0.1 to 10 M. From the viewpoint of achieving both ion conductivity and a lithium equilibrium potential, it is preferable that the anion concentration is 3 to 12 M, which is high. The anion concentration in the aqueous electrolyte containing $NO^{3-}$ and/or $Cl^-$ is more preferably 8 to 12 M.

An aqueous electrolyte containing $LiSO_4^-$ and/or $SO_4^{2-}$ can be used in a range of the anion concentration of about 0.05 to 2.5 M. From the viewpoint of ion conductivity, it is preferable that the anion concentration is 1.5 to 2.5 M, which is high.

Specifically, in the case of aqueous electrolyte containing one or more of $NO^{3-}$, $Cl^-$, $LiSO_4^-$, $SO_4^{2-}$, an anion concentration in the aqueous electrolyte of the positive electrode is preferably about 0.5 to 3 M. When the lithium salt concentration is higher than the anion concentration, the potential of lithium insertion and extraction is shifted to a noble direction, and a side reaction is excessively caused, which is not preferable. In addition, in the case of aqueous electrolyte containing one or more of $NO^{3-}$, $Cl^-$, $LiSO_4^-$, $SO_4^{2-}$, an anion concentration in the aqueous electrolyte of the negative electrode is preferably about 6 to 13 M. When the lithium concentration is lower than the anion concentration, the potential of lithium insertion and extraction is shifted to a less noble direction, and a side reaction is excessively caused, which is not preferable.

It is desirable that an $OH^-$ concentration in the aqueous electrolyte is $10^{-10}$ to 0.1 M.

In addition, the aqueous electrolyte can contain both lithium ions and sodium ions.

It is preferable that a pH of the aqueous electrolyte of the positive electrode is 1 to 7. When the pH of the aqueous electrolyte of the positive electrode is 8 or higher, an oxygen generation reaction caused by the electrolysis of water is likely to be generated. When the pH of the aqueous electrolyte of the positive electrode is lower than 1, decomposition of the active material proceeds, which is not preferable. A pH of the aqueous electrolyte of the negative electrode is preferably 7 to 14. When the pH of the aqueous electrolyte of the negative electrode is lower than 7, a hydrogen generation reaction caused by the electrolysis of water is likely to be generated, which is not preferable.

The solute in the aqueous electrolyte, that is, the first electrolyte can be qualitatively or quantitatively determined, for example, by ion chromatography. The ion chromatography is particularly preferable as an analysis method because it is highly sensitive. Examples of specific measurement conditions for the qualitative and quantitative analysis of the solute contained in the electrolyte by the ion chromatography are shown below:

System: Prominence HIC-SP
Analysis column: Shim-pack IC-SA3
Guard column: Shim-pack IC-SA3 (G)
Eluent: 3.6 mmol/L, aqueous sodium carbonate solution
Flow rate: 0.8 mL/min
Column temperature: 45° C.
Injection amount: 50 μL
Detection: Electric conductivity Whether or not water is contained in the aqueous electrolyte can be confirmed by gas chromatography-mass spectrometry (GC-MS) measurement. In addition, a content of water in the aqueous electrolyte can be measured, for example, by inductively coupled plasma (ICP) optical emission analysis. The number of moles of the solvent can be calculated by measuring a specific weight of aqueous electrolyte. The same or different aqueous electrolytes may be used on the positive electrode side and the negative electrode side.

An inorganic compound, an organic compound or surfactant can be used as an osmotic pressure regulator contained in the aqueous electrolyte of the positive electrode. As the inorganic compound, a compound containing at least one of the group consisting of oxide or chloride ions ($Cl^-$), fluoride ions ($F^-$), iodide ions ($I^-$), perchlorate ions ($ClO_4^-$), formate ions ($HCO_2^-$), acetate ions ($C_2H_3O_2^-$), hydroxide ions ($OH^-$), oxalate ions ($C_2O_2^-$), nitrate ions ($NO^{3-}$), nitrite ions ($NO_2^-$), sulfate ions ($SO_4^{2-}$), thiosulfate ions ($S_2O_3^{2-}$), sulfite ions ($SO_3^{2-}$), carbonate ions ($CO_3^{2-}$), hydrogen carbonate ions ($HCO_3^{2-}$), thiocyanate ions ($SCN^-$), ammonium ions ($NH_4^+$), phosphate ions ($PO_4^{3-}$), and hydrogen phosphate ions ($HPO_4^{2-}$) is preferable in terms that, although such a compound is dissolved in the aqueous electrolyte, a reaction or oxidation does not occur. Examples of the inorganic compound can include sodium chloride, potassium chloride, zinc chloride, sodium fluoride, calcium fluoride, calcium perchlorate, ammonium formate, potassium formate, potassium acetate, sodium acetate, potassium hydroxide, sodium hydroxide, oxalic acid, potassium oxalate, ammonium oxalate, nitric acid, potassium nitrate, sodium nitrate, sodium nitrite, ammonium sulfite, sodium sulfate, sulfuric acid, ammonium thiosulfate, potassium thiosulfate, ammonium carbonate, potassium carbonate, ammonium hydrogen carbonate, potassium hydrogen carbonate, ammonium thiocyanate, potassium thiocyanate, ammonium phosphate, potassium phosphate, ammonium hydrogen phosphate, and potassium hydrogen phosphate.

As the organic compound, similarly to the inorganic compound, a compound that is dissolved in the aqueous electrolyte but is not reacted or oxidized is preferable. As the organic compound, it is possible to use water-miscible organic compound such as alcohols such as methanol, ethanol, butanol, isobutanol, isopropyl alcohol, normal propyl alcohol, tertiary butanol, secondary butyl alcohol, 1,3-butanediol, 1,4-butanediol, 2-ethyl-1-hexanol, and benzyl alcohol; ketones such as acetone, methyl ethyl ketone, methyl isobutyl ketone, diisobutyl ketone, cyclohexanone, and diacetone alcohol; esters such as ethyl acetate, methyl acetate, butyl acetate, sec-butyl acetate, methoxybutyl acetate, amyl acetate, normal propyl acetate, isopropyl acetate, ethyl lactate, methyl lactate, butyl lactate, and ethyl 3-ethoxypropionate; ethers such as isopropyl ether, methyl cellosolve, ethyl cellosolve, butyl cellosolve, 1,4-dioxane, tetrahydrofuran, and methyl tert-butyl ether; glycols such as ethylene glycol, diethylene glycol, triethylene glycol, propylene glycol, ethylene glycol monoethyl ether acetate, propylene glycol monomethyl ether acetate, butyl carbitol acetate, and ethyl carbitol acetate; glycol ethers such as methyl carbitol, ethyl carbitol, butyl carbitol, methyl triglycol, propylene glycol monomethyl ether, propylene glycol monobutyl ether, 3-methoxy-3-methyl-1-butanol, hexyldiglycol, propylene glycol monomethyl ether propionate, and dipropylene glycol methyl ether; glymes such as monoglyme, diglyme, ethyl glyme, ethyl diglyme, triglyme, butyl diglyme, tetraglyme, and dipropylene glycol dimethyl ether; aprotic polar solvents such as dimethyl formamide, dimethyl acetamide, hexamethyl phosphoric triamide, acetonitrile, propionitrile, butyronitrile, isobutyronitrile, valeronitrile, isovaleronitrile, lauronitrile, 2-methylbutyronitrile, trimethyl acetonitrile, hexanenitrile, cyclopentane carbonitrile, cyclohexane carbonitrile, acrylonitrile, methacrylonitrile, crotononitrile, N-methyl-2-pyrrolidone, N-ethyl-2-pyrrolidone, and γ-butyrolactam; cyclic carboxylic acid esters such as gamma-butyrolactone, gamma-valerolactone, gamma-caprolactone, and epsilon-caprolactone; chain carbonate compounds such as dimethyl carbonate, diethyl carbonate, di-n-propyl carbonate, diisopropyl carbonate, n-propylisopropyl carbonate, ethyl methyl carbonate, and methyl-n-propyl carbonate; and amine-based solvents such as methylamine, dimethylamine, trimethylamine, ethylamine, diethylamine, triethylamine, ethylenediamine, triethanolamine, and N,N-diisopropylethylamine.

As the osmotic pressure regulator, a surfactant can be added to the aqueous electrolyte. An example of the surfactant can include a nonionic surfactant such as polyoxyalkylene alkyl ether, polyethylene glycol, polyvinyl alcohol, thiourea, disodium 3,3'-dithiobis(1-propane phosphate) 2 sodium, dimercaptothiadiazole, boric acid, oxalic acid, malonic acid, saccharin, sodium naphthalene sulfonate, gelatin, potassium nitrate, aromatic aldehyde, or heterocyclic aldehyde. The surfactants may be used alone or in combination of two or more thereof. These osmotic pressure regulators may be used alone or as a mixture of two or more thereof in the aqueous electrolyte regardless of the inorganic compound, the organic compound, and the surfactant. By adding these osmotic pressure regulators, the osmotic pressure of the aqueous electrolyte of the negative electrode can be regulated. In addition, as the osmotic pressure regulator used in the negative electrode, the same osmotic pressure regulator as in the positive electrode can be used.

By adding such an osmotic pressure regulator, a difference in osmotic pressure between two electrolytes can be regulated within a range of 90% or less of the higher osmotic pressure.

Here, the osmotic pressure Π (N/m$^2$) can be calculated as follows. That is, when a volume of the solvent in the electrolyte (electrolytic solution) is V (m$^3$), the amount of substance (total number of moles) of the solute in the electrolyte is n (mol), a gas constant is R (m$^2$·kg/(s$^2$·K·mol)), and an absolute temperature of the electrolyte is T (K), the osmotic pressure Π is calculated as in the following Equation (5).

$$\Pi = (n \cdot R \cdot T)/V \qquad (5)$$

Here, in a case where the aqueous electrolyte is an aqueous electrolytic solution, a solute of the aqueous electrolytic solution (first electrolyte) is an inorganic salt, an organic compound, and the like. A structure of the inorganic salt is identified by ICP optical emission spectrometry. A structure of the organic compound is identified by Fourier Transform infrared spectroscopy (FTIR). Then, by fractionating the electrolyte (aqueous electrolytic solution), a concentration of the aqueous electrolytic solution is calculated, and the amount of substance such as the inorganic salt or the organic compound in the aqueous electrolytic solution is calculated. Note that the amount n of substance is the total number of moles of the solute, and the ionization of the solute is also taken into consideration. In fact, in the case where the solute is an inorganic salt or an organic compound, it is considered that the solute is entirely ionized in the aqueous electrolytic solution. For example, in a case where the solute is an alkali metal salt or an alkaline earth metal salt, the amount n of substance of the alkali metal ion or the alkaline earth metal ion is calculated in consideration of the fact that the solute is entirely ionized with respect to the anion. For example, in a case where 12 mol/L of LiCl is dissolved as the solute, it is considered that a concentration is 24 mol/L, because LiCl is ionized into Li$^+$ and Cl$^-$ in the aqueous electrolytic solution.

The osmotic pressure regulator may be contained in any one or both of the aqueous electrolyte of the positive electrode and the aqueous electrolyte of the negative electrode. In a case where the osmotic pressure regulator is added to the aqueous electrolyte of the positive electrode, a molar concentration of the osmotic pressure regulator contained in the aqueous electrolyte is, for example, 2 mol/L to 8 mol/L. When the molar concentration of the osmotic pressure regulator in the aqueous electrolyte of the positive electrode is within this range, a difference in osmotic pressure can be provided without hindering the operation of the secondary battery. The molar concentration of the osmotic pressure regulator in the aqueous electrolyte of the positive electrode is more preferably 2.5 mol/L to 7 mol/L.

In a case where the osmotic pressure regulator is added to the aqueous electrolyte of the negative electrode, a molar concentration of the osmotic pressure regulator is, for example, 0.1 mol/L to 5 mol/L. Within this range, the difference in osmotic pressure can be reduced without increasing a resistance of the aqueous electrolyte. The molar concentration of the osmotic pressure regulator in the aqueous electrolyte of the negative electrode is preferably in a range of 0.5 mol/L to 4 mol/L, and is more preferably in a range of 0.7 mol/L to 3 mol/L.

Whether or not the surfactant is contained in the aqueous electrolyte can be determined by using the above-described GC-MS. For example, the aqueous electrolyte is extracted with hexane, and the organic solvent in the aqueous electrolyte is thus separated. The separated organic solvent can be specified by performing GC-MS and nuclear magnetic resonance (NMR) measurement.

In addition, a molecular weight of the surfactant can be measured by matrix assisted laser desorption/ionization time-of-flight mass spectrometry (MALDI-TOF-MS). As an apparatus, for example, JMS-S3000 Spiral TOF manufactured by JEOL, Ltd. can be used. For data analysis, for example, MS Tornado Analysis manufactured by JEOL, Ltd. can be used. Polymethyl methacrylate (molecular weight standard for size exclusion chromatography) is used as an external standard for a mass composition.

In a MALDI-MS spectrum obtained by the measurement, a value at a position of a peak top is recorded as a molecular weight.

An interfacial tension of the aqueous electrolyte is preferably 80 mN/m or less, for example, 55 mN/m or less. Within this range, the aqueous electrolyte can be soaked into the separator. The aqueous electrolyte can be well soaked into the separator, such that a resistance of the separator can be reduced, the coulomb efficiency at an initial charge and discharge can be increased, and a capacity ratio of the negative electrode to the positive electrode when a battery is designed can be closer to 1. Therefore, a battery with a small capacity loss can be designed. The interfacial tension of the aqueous electrolyte is more preferably 50 mN/m or less, and still more preferably 40 mN/m or less. The surfactants added to the aqueous electrolyte may be used alone or in combination of two or more thereof.

A measurement method of the interfacial tension is as follows.

<Measurement Method of Interfacial Tension of Aqueous Electrolyte>

The interfacial tension of the aqueous electrolyte can be obtained, for example, by a hanging drop method. As a measuring apparatus, for example, an automatic contact angle meter Dme-201 manufactured by Kyowa Interface Science, Inc. can be used. As a measurement condition, for example, conditions shown in Table 1 are used.

TABLE 1

| Interfacial tension measurement condition | |
|---|---|
| Measuring interval (ms): | 1000 |
| Number of times: | 21 |
| Fit section: | 60 |
| Endpoint interval (dot): | 30 |
| Waiting time until measurement (ms): | 10000 |
| Algorithm: | Auto |
| Image mode: | Frame |
| Automatic threshold level: | Yes |
| Black level (%): | 70 |
| Threshold level: | 128 |
| Left image processing area: | 30 |
| Upper image processing area: | 30 |
| Right image processing area: | 30 |
| Lower image processing area: | 30 |
| Automatic droplet deposition recognition: | Yes |
| Droplet deposition recognition line (dot): | 50 |
| Curvature correction: | No |
| Radius of curvature (μm): | 1000000 |
| Control mode: | Standard |
| Automatic droplet generation: | Yes |
| Liquid amount control: | Yes |
| Prepared liquid amount (μL): | 2 |
| Automatic droplet deposition operation: | Yes |
| Automatic sample stand movement: | Yes |
| Reciprocating: | No |
| Measurement movement interval (mm): | 6 |
| Number of repetitions: | 10 |

The interfacial tension is calculated by the hanging drop method, and the interfacial tension of the aqueous electrolyte is calculated from the following Equation (6).

$$\text{Interfacial tension (mN/M)} = \Delta\rho g d e^2 (1/H) \quad (6)$$

In Equation (6), the meaning of each symbol is as follows: $\Delta\rho$: density difference, g: gravitational acceleration, de: maximum diameter of hanging drop, and 1/H: correction coefficient. For example, the measurement is performed 5 times, and an average value thereof can be taken as an interfacial tension.

<Measurement Method of Contact Angle of Aqueous Electrolyte>

A contact angle of the aqueous electrolyte can be obtained, for example, by a drop method. As a measuring apparatus, for example, an automatic contact angle meter Dme-201 manufactured by Kyowa Interface Science, Inc. can be used. As a measurement condition, for example, conditions shown in Table 2 are used.

TABLE 2

| Contact angle measurement condition | |
|---|---|
| Measuring interval (ms): | 1000 |
| Number of times: | 21 |
| Analysis manner: | Sessile drop |
| Analysis method: | Standard |
| Three-phase system: | No |
| Fit section designation: | No |
| Fit section: | 60 |
| Endpoint interval (dot): | 30 |
| Waiting time until measurement (ms): | 10000 |
| Algorithm: | Auto |
| Image mode: | Frame |
| Automatic threshold level: | Yes |
| Black level (%): | 70 |
| Threshold level: | 128 |
| Left image processing area: | 30 |
| Upper image processing area: | 30 |
| Right image processing area: | 30 |
| Lower image processing area: | 30 |
| Automatic droplet deposition recognition: | Yes |
| Droplet deposition recognition line (dot): | 50 |
| Curvature correction: | No |
| Radius of curvature (μm): | 1000000 |
| Control mode: | Standard |
| Automatic droplet generation: | Yes |
| Liquid amount control: | Yes |
| Prepared liquid amount (μL): | 2 |
| Automatic droplet deposition operation: | Yes |
| Automatic sample stand movement: | Yes |
| Reciprocating: | No |
| Measurement movement interval (mm): | 6 |
| Number of repetitions: | 10 |
| Automatic liquid sample change measurement: | 0 |
| Solid sample replacement: | No |
| Liquid amount unit: | μL |
| Acceptable range mode: | No |
| Acceptable range lower limit: | 0 |
| Acceptable range upper limit: | 180 |
| Stage control mode: | 1 |

(Separator)

The separator can be disposed between the positive electrode and the negative electrode. When the separator is formed of an insulating material, it is possible to prevent electrical contact between the positive electrode and the negative electrode. In addition, it is desirable to use a separator having a shape that allows the electrolyte to move between the positive electrode and the negative electrode. In the following examples, the separator has a gas permeability. Examples of the separator can include nonwoven fabric, a film, and paper. Examples of the material forming the separator can include polyolefin such as polyethylene or polypropylene and cellulose. Preferred examples of the separator can include nonwoven fabric including cellulose fiber and a porous film including polyolefin fiber.

A gas permeability (gas permeability coefficient) of the separator is preferably $1 \times 10^{-14}$ m$^2$ or less. When the gas permeability is more than $1 \times 10^{-14}$ m$^2$, the aqueous electrolyte of the positive electrode side and the aqueous electrolyte of the negative electrode side are mixed, and drying of the aqueous electrolyte in the lower osmotic pressure side is likely to occur, which is not preferable. The gas permeability is more preferably $1 \times 10^{-15}$ m$^2$ or less, and still more preferably $1 \times 10^{-16}$ m$^2$ or less. By using the separator having such gas permeability, the mixing of the aqueous electrolyte of the positive electrode and the aqueous electrolyte of the negative electrode can be kinetically sufficiently suppressed, and thus the coulomb efficiency is increased, which is preferable. This is because rate characteristics are improved by allowing the aqueous electrolyte to be sufficiently soaked into the separator, thereby reducing the resistance of the separator and increasing the ion conductivity. The aqueous electrolyte is well soaked into the separator, but not so much that the aqueous electrolyte of the positive electrode and the aqueous electrolyte of the negative electrode are mixed.

A gas permeability KT (m$^2$) of the separator is measured as follows. In the calculation of the gas permeability KT, for example, in a case where a separator having a thickness L (m) is used as a measuring object, a gas with a viscosity coefficient σ (Pa·s) permeates within a range of a measuring area A (m$^2$). In this case, under a plurality of conditions in which pressures p (Pa) of gas to be charged are different from each other, the gas permeates, and the amounts of gas Q (m$^3$/s) permeating the separator are measured in each of the plurality of conditions. Then, from the measurement results, the amount of gas Q is plotted with respect to the pressure p, and dQ/dp that is a slope is obtained. Then, from the thickness L, the measuring area A, the viscosity coefficient σ, and the slope dQ/dp, the gas permeability KT is calculated as in the following Equation (7).

$$KT=((\sigma \cdot l)/A) \times (dQ/dp) \quad (7)$$

In an example of the calculation method of the gas permeability KT, a separator is interposed between a pair of stainless steel plates each having an opened hole with a diameter of 10 mm. Then, air is fed at the pressure p through the hole of one stainless steel plate. Then, the amount of gas Q of the air leaking from the hole of the other stainless steel plate is measured. Therefore, an area (25π mm$^2$) of the hole is used as the measuring area A, and 0.000018 Pa·s is used as the viscosity coefficient σ. In addition, the amount of gas Q is calculated by measuring the amount δ (m$^3$) of gas leaking from the hole during 100 seconds, and dividing the measured amount δ by 100.

Then, at four points at which the pressures p are different from each other by at least 1,000 Pa, the amount of gas Q with respect to each pressure p as described above is measured. The amount of gas Q with respect to the pressure p is measured, for example, at each of four points at which the pressures p are 1,000 Pa, 2,500 Pa, 4,000 Pa, and 6,000 Pa. Then, the amount of gas Q is plotted with respect to the pressure p at each of the four measured points, and the slope (dQ/dp) of the amount of gas Q with respect to the pressure p is calculated by straight line fitting (least-squares method). Then, the gas permeability KT is calculated by multiplying the calculated slope (dQ/dp) by (σ·L)/A.

In the measurement of the gas permeability of the separator, the separator is separated from the battery to be separated from other parts of the battery. Both surfaces of the separator are washed with pure water, immersed in pure water, and then allowed to stand for 48 hours or longer. Thereafter, both the surfaces are further washed with pure water, and dried in a vacuum dryer at 100° C. for 48 hours or longer, and then the gas permeability is measured. In addition, the gas permeability is measured at a plurality of arbitrary portions of the separator. Then, a value measured at a portion at which the gas permeability is the smallest among the plurality of arbitrary portions is taken as the gas permeability of the separator.

A porosity of the separator is preferably 60% or more. In addition, a diameter of fiber is preferably 10 μm or less. When the diameter of fiber is 10 μm or less, the affinity of the separator with the electrolyte is enhanced, and thus the resistance of the battery can be reduced. A more preferred range of the diameter of fiber is in a range of 3 μm or less. A separator of nonwoven fabric including cellulose fiber having a porosity of 60% or more is preferably impregnated with the electrolyte, and can exhibit a high output performance at a high temperature from a low temperature. In addition, the above separator is not reacted with the negative electrode even during long-term storage in a charged state, float charge, and over charge, and a short circuit between the negative electrode and the positive electrode caused by precipitation of dendrites of the lithium metal does not occur. A more preferred range of the porosity is in a range of 62% to 80%.

In addition, a solid electrolyte can be used as the separator. As the solid electrolyte, $Li_{1+x}Al_xTi_{2-x}(PO_4)_3$ (LATP) (0.1≤x≤0.4) having a NASICON type structure, amorphous $Li_{2.9}PO_{3.3}N_{0.46}$ (LIPON), or oxide such as garnet $Li_7La_3Zr_2O_{12}$ (LLZ) is preferable.

In addition, examples of the solid electrolyte can include β alumina, $Na_{1+x}Zr_2Si_xP_{3-x}O_{12}$ (0≤x≤3), and $NaAlSi_3O_8$.

As the separator, it is possible to use a separator having a solid electrolyte layer formed on at least one of main surfaces of a porous free-standing film. As the solid electrolyte included in the solid electrolyte layer, the above-described LATP can be used.

A thickness of the separator is preferably 20 μm to 100 μm, and a density of the separator is preferably 0.2 g/cm$^3$ to 0.9 g/cm$^3$. Within these ranges, a balance between the mechanical strength and the reduction of the resistance of the battery can be achieved, and thus it is possible to provide a secondary battery with a high power in which an internal short circuit is suppressed. In addition, a thermal contraction of the separator is small in a high temperature environment, and the secondary battery can exhibit an excellent high temperature storage performance.

(Negative Electrode)

The negative electrode includes a negative electrode current collector, and a negative electrode active material layer disposed on the negative electrode current collector. The negative electrode active material layer is disposed on at least one surface of the negative electrode current collector. For example, the negative electrode active material layer may be disposed on one surface of the negative electrode current collector. Alternatively, the negative electrode active material layers may be disposed on a surface of the negative electrode current collector and a rear surface thereof, respectively.

The negative electrode active material layer is formed of a negative electrode active material containing at least one compound selected from the group consisting of titanium oxide, lithium titanium oxide, and lithium titanium composite oxide. These oxides can be used alone or a plurality of oxides may be used as a mixture. In these oxides, a Li insertion and extraction reaction is generated in a range of 1 V to 2 V (vs. Li/Li$^+$) based on a lithium potential. Therefore, in a case where these oxides are used as the negative electrode active material of the secondary battery, a volume expansion and contraction change accompanied by charging and discharging is small, and thus a long lifespan of the battery can be realized.

It is preferable that at least one element selected from the group consisting of Zn, Ga, In, Bi, Tl, Sn, Pb, Ti, and Al is contained in the negative electrode current collector. Hereinafter, these elements are also referred to as an element A. These elements can be used alone or a plurality of elements may be used as a mixture. These elements can be contained in a form of a metal or a metal alloy. The metal and the metal alloy can be contained alone or as a mixture of two or more thereof. In a case where these elements are contained in the current collector, the mechanical strength of the current collector is increased, and thus a processing performance is improved. Furthermore, the effect of suppressing electrolysis of the aqueous solvent and thus suppressing the generation of hydrogen is increased. Among the elements, Zn, Pb, Ti, and Al are more preferable.

The current collector is, for example, a metal foil formed of these metals. In addition, the current collector is, for example, a foil formed of an alloy containing these metals. Such a foil may contain other element, for example, Cu, in addition to the element A. In addition to the foil, an example of a shape of a metallic body can include mesh or a porous body. In order to improve an energy density and power, it is desirable that a shape of the foil has a small volume and a large surface area.

In addition, the negative electrode current collector can include a substrate containing a metal different from the element A. In this case, a compound containing the element A is present on at least a part of a surface of the substrate, such that the generation of hydrogen can be suppressed. The compound containing the element A present on the surface of the substrate is desirably disposed so as to be in contact with the negative electrode active material layer. For example, by plating the element A on the substrate, the compound containing the element A can be present on the surface of the substrate. Alternatively, it is possible to perform a plating treatment using an alloy containing the element A on the surface of the substrate.

The current collector may contain at least one compound selected from the group consisting of the element A. An oxide of the element A, a hydroxide of the element A, a basic carbonate compound of the element A, and/or a sulfate compound of the element A is preferably included in at least a part of a surface region of the current collector, within a depth region of 5 nm from the surface of the current collector to 1 µm from the surface of the current collector in a depth direction. An example of the oxide of the element A can include ZnO. An example of the hydroxide of the element A can include Zn(OH)$_2$. An example of the basic carbonate compound of the element A can include 2ZnCO$_3$·3Zn(OH)$_2$. An example of the sulfate compound of the element A can include ZnSO$_4$·7H$_2$O.

When at least one of the oxide of the element A, the hydroxide of the element A, the basic carbonate compound of the element A, and the sulfate compound of the element A is present in the surface layer portion of the current collector, the generation of hydrogen can be suppressed. In addition, when these compounds are present in the surface layer portion of the current collector, adhesiveness to each of the current collector, the active material, a conductive assistant, and a binder are improved, whereby electron conductive paths can be increased. Therefore, it is possible to improve the cycle characteristics and to reduce the resistance.

The substrate preferably includes at least one metal selected from the group consisting of Al, Fe, Cu, Ni, and Ti. These metals can be included in a form of an alloy. In addition, the substrate can include the metal and the metal alloy alone or as a mixture of two or more thereof. From the viewpoint of weight reduction, the substrate preferably includes Al, Ti, or an alloy thereof.

Whether or not at least one compound selected from the group consisting of the elements A is contained in the current collector can be determined by decomposing the battery as described above and then performing inductively coupled plasma (ICP) optical emission spectrometry.

The negative electrode active material includes one or two or more compounds selected from the group consisting of titanium oxide, lithium titanium oxide, and lithium titanium composite oxide. Examples of the lithium titanium composite oxide can include niobium titanium oxide and sodium niobium titanium oxide. It is desirable that a Li absorption potential of these compounds is in a range of 1 V (vs. Li/Li$^+$) to 3 V (vs. Li/Li$^+$).

Examples of the titanium oxide can include titanium oxide having a monoclinic structure, titanium oxide having a rutile structure, and titanium oxide having an anatase structure. For each titanium oxide having a crystal structure, a composition before charging can be represented by TiO$_2$, and a composition after charging can be represented by Li$_x$TiO$_2$ (0≤x). In addition, the structure for the titanium oxide having the monoclinic structure before charging can be represented by TiO$_2$ (B).

Examples of the lithium titanium oxide can include lithium titanium oxide having a spinel structure (for example, general formula Li$_{4+x}$Ti$_5$O$_{12}$ (−1≤x≤3)), lithium titanium oxide having a ramsdellite structure (for example, Li$_{2+x}$Ti$_3$O$_7$ (−1≤x≤3)), Li$_{1+x}$Ti$_2$O$_4$ (0≤x≤1), Li$_{1.1+x}$Ti$_{1.8}$O$_4$ (0≤x≤1), Li$_{1.07+x}$Ti$_{1.86}$O$_4$ (0≤x≤1), and Li$_x$TiO$_2$ (0<x).

Examples of the niobium titanium oxide can include a compound represented by Li$_a$TiM$_b$Nb$_{2\pm\beta}$O$_{7\pm\sigma}$ (0≤a≤5, 0≤b≤0.3, 0≤β≤0.3, and 0≤σ≤0.3, where, M is at least one element selected from the group consisting of Fe, V, Mo, and Ta).

Examples of the sodium niobium titanium oxide can include an orthorhombic Na-containing niobium titanium composite oxide represented by the general formula Li$_{2+v}$Na$_{2-w}$M1$_x$Ti$_{6-y-z}$Nb$_y$M2$_z$O$_{14+\delta}$ (0≤v≤4, 0<w<2, 0≤x<2, 0<y<6, 0≤z<3, y+z<6, and −0.5≤δ≤0.5, where, M1 includes at least one selected from the group consisting of Cs, K, Sr, Ba, and Ca, and M2 includes at least one selected from the group consisting of Zr, Sn, V, Ta, Mo, W, Fe, Co, Mn, and Al).

Examples of a preferred compound for the negative electrode active material can include titanium oxide having an anatase structure, titanium oxide having a monoclinic structure, and lithium titanium oxide having a spinel structure. A Li absorption potential of each compound is in a range of 1.4 V (vs. Li/Li$^+$) to 2 V (vs. Li/Li$^+$), and thus, when combined with lithium manganese oxide as the positive electrode active material, for example, a high electromotive force can be obtained. Among them, the lithium titanium oxide having a spinel structure is more preferable, because it has an extremely small volume change by a charging and discharging reaction.

The negative electrode active material can be contained in the negative electrode active material layer in a form of particles. The negative electrode active material particle can be single primary particles, secondary particles obtained by aggregating the primary particles, or a mixture of the single primary particles and the secondary particles. A shape of the particle is not particularly limited and, for example, can be a spherical shape, an elliptic shape, a flat shape, a fibrous shape, or the like.

An average particle size (diameter) of the secondary particles of the negative electrode active material is preferably 3 μm or more, and more preferably 5 μm to 20 μm. Within this range, a surface area of the active material is small, and thus the effect of suppressing the generation of hydrogen can be increased.

The negative electrode active material having the secondary particles of which the average particle size is 3 μm or more can be obtained, for example, by the following method. First, an active material precursor having an average particle size of 1 μm or less is prepared by performing reaction synthesis on a raw material for the active material. Thereafter, the active material precursor is subjected to a sintering treatment, and then a pulverization treatment (grinding treatment) is performed with a pulverizer (grinder) such as a ball mill or a jet mill. Next, in the sintering treatment, the active material precursors are aggregated to be grown into secondary particles having a large particle size.

It is desirable that an average particle size of the primary particles of the negative electrode active material is 1 μm or less. Accordingly, a diffusion distance of Li ions in the active material is shortened, and a specific surface area of the negative electrode active material particles is increased. Therefore, a high input performance (rapid charging performance) can be obtained. On the other hand, when the average particle size is small, the particles are likely to be aggregated, and thus the distribution of the electrolyte is biased to the negative electrode, and a shortage (exhaustion) of the electrolyte may occur at the positive electrode. Therefore, a lower limit of the average particle size is desirably 0.001 μm. The average particle size of the primary particles of the negative electrode active material is more preferably 0.1 μm to 0.8 μm.

It is desirable that the specific surface area of the negative electrode active material particles obtained by a BET method by $N_2$ deposition is in a range of 3 $m^2/g$ to 200 $m^2/g$. Accordingly, the affinity between the negative electrode and the electrolyte can be further enhanced.

It is desirable that a specific surface area of the negative electrode active material layer (excluding the current collector) is in a range of 3 $m^2/g$ to 50 $m^2/g$. A more preferred range of the specific surface area is 5 $m^2/g$ to 50 $m^2/g$. The negative electrode active material layer can be a porous layer that is supported on the current collector and includes a negative electrode active material, a conductive agent, and a binder.

A porosity of the negative electrode (excluding the current collector) is desirably in a range of 20 to 50%. Therefore, it is possible to obtain a negative electrode having excellent affinity with the electrolyte and a high density. A more preferred range of the porosity is 25 to 40%.

Examples of the conductive agent can include a carbon material such as acetylene black, carbon black, coke, carbon fiber, or graphite, and metal powder such as nickel or zinc. The conductive agents can be used alone or as a mixture of two or more thereof. The carbon material generates hydrogen by itself, and thus the metal powder is desirably used as the conductive agent.

Examples of the binder can include polytetrafluoroethylene (PTFE), polyvinylidene fluoride (PVdF), fluoro rubber, ethylene-butadiene rubber, polypropylene (PP), polyethylene (PE), carboxymethyl cellulose (CMC), polyimide (PI), and polyacrylimide (PAI). The binders can be used alone or as a mixture of two or more thereof.

It is preferable that mixing ratios of the negative electrode active material, the conductive agent, and the binder in the negative electrode active material layer are 70 wt % to 95 wt %, 3 wt % to 20 wt %, and 2 wt % to 10 wt %, respectively. When the mixing ratio of the conductive agent is 3 wt % or more, the conductivity of the negative electrode can be preferable. When the mixing ratio of the conductive agent is 20 wt % or less, the decomposition of the electrolyte on a surface of the conductive agent can be reduced. When the mixing ratio of the binder is 2 wt % or more, a sufficient electrode strength can be obtained. When the mixing ratio of the binder is 10 wt % or less, an insulating portion of the electrode can be reduced.

The negative electrode can be produced as follows. First, the negative electrode active material, the conductive agent, and the binder are dispersed in an appropriate solvent to prepare a slurry. The slurry is coated onto the current collector, and a coated film is dried to form a negative electrode active material layer on the current collector. Here, for example, the slurry may be coated on one surface of the current collector, or may be coated on both a surface of the current collector and a rear surface thereof. Next, the current collector and the negative electrode active material layer are subjected to pressing such as heat pressing, whereby a negative electrode can be produced.

(Positive Electrode)

The positive electrode can include a positive electrode current collector and a positive electrode layer that is supported on one surface or both surfaces of the positive electrode current collector and includes an active material, a conductive agent, and a binder.

As the positive electrode current collector, it is preferable to use a foil, a porous body, or mesh formed of a metal such as stainless steel, Al, or Ti. In order to prevent corrosion of the current collector caused by the reaction of the current collector with the electrolyte, the surface of the current collector may be coated with another element.

As the positive electrode active material, a material capable of absorbing and desorbing lithium or sodium can be used. The positive electrode may include one kind of positive electrode active material, or include two or more kinds of positive electrode active materials. Examples of the positive electrode active material can include lithium manganese composite oxide, lithium nickel composite oxide, lithium cobalt aluminum composite oxide, lithium nickel cobalt manganese composite oxide, spinel type lithium manganese nickel composite oxide, lithium manganese cobalt composite oxide, lithium iron oxide, lithium iron fluoride sulfate, and a phosphate compound having an olivine crystal structure (for example, $Li_xFePO_4$ ($0 \leq x \leq 1$), and $Li_xMnPO_4$ ($0 \leq x \leq 1$)). The phosphate compound having an olivine crystal structure has an excellent thermal stability.

Examples of the positive electrode active material by which a high electrode potential is obtained are described below. Examples of the positive electrode active material can include lithium manganese composite oxide having a spinel structure such as $Li_xMn_2O_4$ ($0<x \leq 1$) or $Li_xMnO_2$ ($0<x \leq 1$); lithium nickel aluminum composite oxide such as $Li_xNi_{1-y}Al_yO_2$ ($0<x \leq 1$ and $0<y \leq 1$); lithium cobalt composite oxide such as $Li_xCoO_2$ ($0<y \leq 1$); lithium nickel cobalt composite oxide such $Li_xNi_{1-y-z}Co_yMn_zO_2$ ($0<x \leq 1$, $0<y \leq 1$, and $0 \leq z \leq 1$); lithium manganese cobalt composite oxide such as $Li_xMn_yCo_{1-y}O_2$ ($0<x \leq 1$ and $0<y \leq 1$); spinel type lithium manganese nickel composite oxide such as $Li_xMn_{2-y}Ni_yO_4$ ($0<x\leq1$ and $0<y<2$); lithium phosphorus oxide having an olivine structure such as $Li_xFePO_4$ ($0<x\leq1$), $Li_xFe_{1-y}Mn_yPO_4$ ($0<x\leq1$ and $0\leq y\leq1$), or $Li_xCoPO_4$ ($0<x\leq1$); and iron fluoride sulfate such as $Li_xFeSO_4F$ ($0<x\leq1$).

In addition, examples of the positive electrode active material can include sodium manganese composite oxide, sodium nickel composite oxide, sodium cobalt composite oxide, sodium nickel cobalt manganese composite oxide, sodium iron composite oxide, sodium phosphorus oxide (for example, sodium iron phosphate or sodium vanadium phosphate), sodium iron manganese composite oxide, sodium nickel titanium composite oxide, sodium nickel iron composite oxide, and sodium nickel manganese composite oxide.

Preferred examples of the positive electrode active material can include iron composite oxide (for example, $Na_yFeO_2$, $0\leq y\leq1$), iron manganese composite oxide (for example, $Na_yFe_{1-x}Mn_xO_2$, $0<x<1$ and $0\leq y\leq1$), nickel titanium composite oxide (for example, $Na_yNi_{1-x}Ti_xO_2$, $0<x<1$ and $0\leq y\leq1$), nickel iron composite oxide (for example, $Na_yNi_{1-x}Fe_xO_2$, $0<x<1$ and $0\leq y\leq1$), nickel manganese composite oxide (for example, $Na_yNi_{1-x}Mn_xO_2$, $0<x<1$ and $0\leq y\leq1$), nickel manganese iron composite oxide (for example, $Na_yNi_{1-x-z}Mn_xFe_zO_2$, $0<x<1$, $0\leq y\leq1$, $0<z<1$, and $0<1-x-z<1$), and iron phosphate (for example, $Na_yFePO_4$, $0\leq y\leq1$).

Particles of the positive electrode active material can be single primary particles, secondary particles obtained by aggregating the primary particles, or a mixture of both the single primary particles and the secondary particles. An average particle size (diameter) of the primary particles of the positive electrode active material is preferably 10 µm or less and more preferably 0.1 µm to 5 µm. An average particle size (diameter) of the secondary particles of the positive electrode active material is preferably 100 µm or less and more preferably 10 µm to 50 µm.

It is preferable that at least a part of a surface of a particle of the positive electrode active material is coated with a carbon material. The carbon material may be in a form of a layered structure, a particulate structure, or a particle aggregate.

Examples of the conductive agent for increasing electron conductivity of the positive electrode layer and suppressing a contact resistance with the current collector can include acetylene black, carbon black, graphite, and carbon fiber having an average fiber diameter of 1 µm or less. The conductive agents can be used alone or as a mixture of two or more thereof.

Examples of the binder for binding the active material to the conductive agent can include polytetrafluoroethylene (PTFE), polyvinylidene fluoride (PVdF), fluoro rubber, ethylene-butadiene rubber (SBR), polypropylene (PP), polyethylene (PE), carboxymethyl cellulose (CMC), polyimide (PI), and polyacrylimide (PAI). The binders can be used alone or as a mixture of two or more thereof.

It is preferable that mixing ratios of the positive electrode active material, the conductive agent, and the binder in the positive electrode layer are 70 wt % to 95 wt %, 3 wt % to 20 wt %, and 2 wt % to 10 wt %, respectively. When the mixing ratio of the conductive agent is 3 wt % or more, the conductivity of the positive electrode can be preferable. When the mixing ratio of the conductive agent is 20 wt % or less, the decomposition of the electrolyte on a surface of the conductive agent can be reduced. When the mixing ratio of the binder is 2 wt % or more, a sufficient electrode strength can be obtained. When the mixing ratio of the binder is 10 wt % or less, an insulating portion of the electrode can be reduced.

The positive electrode can be produced as follows. First, the positive electrode active material, the conductive agent, and the binder are dispersed in an appropriate solvent to prepare a slurry. The slurry is coated onto the current collector, and a coated film is dried to form a positive electrode layer on the current collector. Here, for example, the slurry may be coated on one surface of the current collector, or may be coated on both a surface of the current collector and a rear surface thereof. Next, the current collector and the positive electrode layer are subjected to pressing such as heat pressing, whereby a positive electrode can be produced.

(Container)

A container made of a metal, a container made of a laminate film, a container made of a resin, such as polyethylene or polypropylene, can be used as a container in which the positive electrode, the negative electrode, and the electrolyte are housed.

As the container made of a metal, it is possible to use a metal can formed of nickel, iron, stainless steel, or the element A and having an angular or a cylindrical shape.

A thickness of each of the container made of a resin and the container made of a metal is desirably in a range of 1 mm or less, more preferably 0.5 mm or less, and still more preferably 0.3 mm or less. In addition, a lower limit value of the thickness is desirably 0.05 mm.

Examples of the laminate film can include a multilayer film in which a metal layer is covered with resin layers. Examples of the metal layer can include a stainless steel foil, an aluminum foil, and an aluminum alloy foil. A polymer such as polypropylene (PP), polyethylene (PE), nylon, and polyethylene terephthalate (PET) can be used for the resin layer. A thickness of the laminate film is preferably in a range of 0.5 mm or less and more preferably 0.2 mm or less. In addition, a lower limit value of the thickness of the laminate film is desirably 0.01 mm.

The secondary battery according to an embodiment can be applied to secondary batteries of various forms such as an angular shape, a cylindrical shape, a flat-type, a thin type, and a coin type. Furthermore, a secondary battery having a bipolar structure is preferable. Therefore, a plurality of cells connected in series can be produced into one cell.

FIG. 1 is a cross-sectional view schematically illustrating an example of a secondary battery according to an embodiment. A secondary battery 10 illustrated in FIG. 1 includes: a negative electrode 3 including a negative electrode current collector 3a and negative electrode active material layers 3b; a positive electrode 5 including a positive electrode current collector 5a and positive electrode active material layers 5b; a first aqueous electrolyte 11 in contact with the positive electrode; a second aqueous electrolyte 12 in contact with the negative electrode; and an external member 2. The negative electrode active material layer 3b is provided on a part of each of both surfaces of the negative electrode current collector 3a. The positive electrode active material layer 5b is provided on a part of each of both surfaces of the positive electrode current collector 5a. A portion of the negative electrode current collector 3a which is not covered with the negative electrode active material layer 3b functions as a negative electrode tab 3c. A portion of the positive electrode current collector 5a which is not covered with the positive electrode active material layer 5b functions as a positive electrode tab 5c. A separator 4 is disposed between the negative electrode 3 and the positive electrode 5.

The positive electrode 5 is housed in the external member 2 in a state in which the positive electrode tab 5c protrudes outward. The negative electrode 3 is housed in the external member 2 in a state in which the negative electrode tab 3c protrudes outward. The first aqueous electrolyte 11 and the second aqueous electrolyte 12 are housed in the external member 2.

The first aqueous electrolyte 11 included in the secondary battery 10 illustrated in FIG. 1 is an aqueous electrolyte in a gel state. The second aqueous electrolyte 12 is an aqueous electrolyte in a liquid state. Although not illustrated, the first aqueous electrolyte 11 may be an aqueous electrolyte in a liquid state, the second aqueous electrolyte 12 may be an aqueous electrolyte in a gel state, or both the first aqueous electrolyte 11 and the second aqueous electrolyte 12 may be aqueous electrolytes in a liquid state or aqueous electrolytes in a gel state.

Another example of the secondary battery according to the present embodiment will be described with reference to FIGS. 2 and 3.

Figure 2:
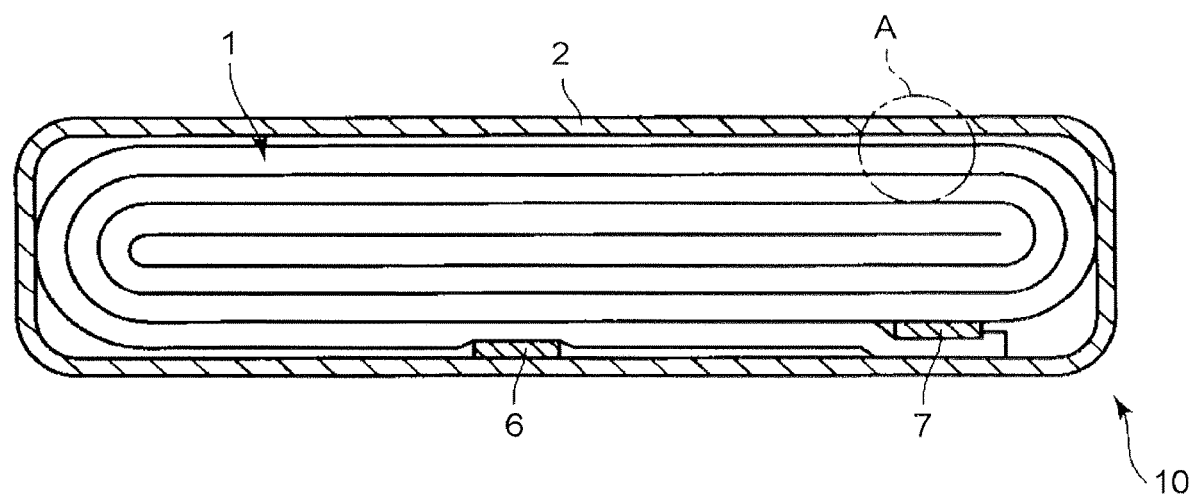
FIG. 2 is a cross-sectional view schematically illustrating another example of the secondary battery according to the first embodiment.

FIG. 2 is a cross-sectional view schematically illustrating another example of a secondary battery according to an embodiment. FIG. 3 is an enlarged cross-sectional view of a portion A in FIG. 2.

Figure 3:
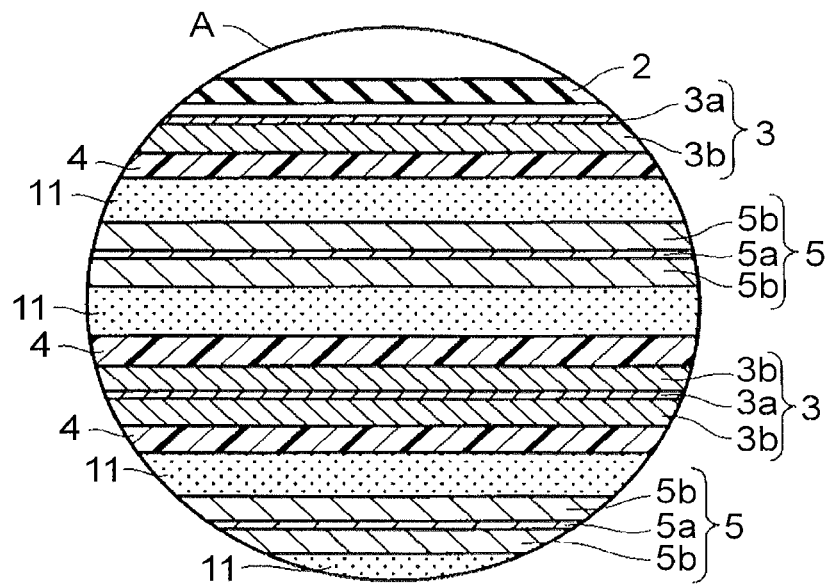
FIG. 3 is an enlarged cross-sectional view of a portion A in FIG. 2.

The secondary battery 10 illustrated in each of FIGS. 2 and 3 includes a flat wound electrode group 1. As illustrated in FIG. 3, the wound electrode group 1 includes a negative electrode 3, a separator 4, a positive electrode 5, and a first aqueous electrolyte 11. The first aqueous electrolyte 11 is provided on each of both surfaces of the positive electrode 5. The separator 4 is interposed between the first aqueous electrolyte 11 and the negative electrode 3. The wound electrode group 1 can be formed by spirally winding a laminate formed by laminating the negative electrode 3, the separator 4, and the positive electrode 5 having both surfaces on which the first aqueous electrolytes 11 are provided, while disposing the negative electrode 3 on an outer side as illustrated in FIG. 3, and press-molding the laminate.

The negative electrode 3 includes a negative electrode current collector 3a and a negative electrode active material layer 3b. The outermost negative electrode 3, as illustrated in FIG. 3, has a structure in which the negative electrode active material layer 3b is formed on only one inner-side surface of the negative electrode current collector 3a. The other negative electrode 3 has a structure in which the negative electrode active material layers 3b are formed on both surfaces of the negative electrode current collector 3a.

The positive electrode 5 includes the positive electrode active material layers 5b formed on both surfaces of the positive electrode current collector 5a. The first aqueous electrolyte 11 is provided on the positive electrode active material layer 5b formed on each of both surfaces of the positive electrode 5a.

As illustrated in FIGS. 2 and 3, in the vicinity of an outer peripheral end of the wound electrode group 1, a negative electrode terminal 6 is connected to the negative electrode current collector 3a of the outermost negative electrode 3, and a positive electrode terminal 7 is connected to the positive electrode current collector 5a of the positive electrode 5 positioned inside the wound electrode group 1.

The wound electrode group 1 is housed in the external member (bag-like container) 2 made of a laminate film having a metal layer interposed between two resin layers.

The negative electrode terminal 6 and the positive electrode terminal 7 extend outward from an opening of the bag-like container 2. For example, the second aqueous electrolyte in a liquid state (not illustrated) is injected through the opening of the bag-like container 2 and housed in the bag-like container 2.

The opening of the bag-like container 2 is heat-sealed while interposing the negative electrode terminal 6 and the positive electrode terminal 7 therein so as to completely seal the wound electrode group 1 and the second aqueous electrolyte. In the secondary battery 10 illustrated in FIGS. 2 and 3, the positive electrode 5 is in contact with the first aqueous electrolyte, and the negative electrode 3 is in contact with the second aqueous electrolyte.

According to the embodiment described above, the secondary battery according to the first embodiment includes the positive electrode, the first aqueous electrolyte held on and in the positive electrode, the negative electrode, the second aqueous electrolyte held on and in the negative electrode, and the separator interposed between the positive electrode and the negative electrode. A difference between an osmotic pressure of the first aqueous electrolyte and an osmotic pressure of the second aqueous electrolyte is 90% or less of the higher one of the osmotic pressure of the first aqueous electrolyte and the osmotic pressure of the second aqueous electrolyte. By having such a configuration, the first aqueous electrolyte and the second aqueous electrolyte can be prevented from being mixed with each other, and thus an adequate pH of each of the aqueous electrolytes can be maintained. Therefore, electrolysis of water contained in the aqueous electrolyte can be prevented. As a result, it is possible to provide a secondary battery having an excellent storage performance and excellent cycle characteristics.

Second Embodiment

According to a second embodiment, a battery module including, as a unit cell, secondary batteries can be provided. The secondary battery of the first embodiment can be used as the secondary battery in the battery module.

Examples of the battery module can include a battery module including, as a constituent unit, a plurality of unit cells electrically connected in series or in parallel, and a battery module including a unit composed of a plurality of unit cells electrically connected in series or a unit composed of a plurality of unit cells electrically connected in parallel.

The battery module may be housed in a case. As the case, a metal can formed of an aluminum alloy, iron, stainless steel, or the like, a plastic container, and the like can be used. In addition, a thickness of the container is desirably 0.5 mm or more.

Examples of a form in which a plurality of secondary batteries are electrically connected in series or in parallel can include a form in which a plurality of secondary batteries each including a container are electrically connected in series or in parallel, and a form in which a plurality of electrode groups housed in the same case are electrically connected in series or in parallel. A specific example of the former is a form in which positive electrode terminals and negative electrode terminals of the plurality of secondary batteries are connected by bus bars formed of a metal (for example, aluminum, nickel, or copper). A specific example of the latter is a form in which a plurality of electrode groups are housed in one case in a state in which they are electrochemically insulated by partitions, and the electrode groups are electrically connected in series. When the number of batteries electrically connected in series is in a range of 5 to 7, voltage compatibility with a lead storage battery is improved. To improve the voltage compatibility with a lead storage battery, it is preferable that five or six unit cells are connected in series.

Figure 4:
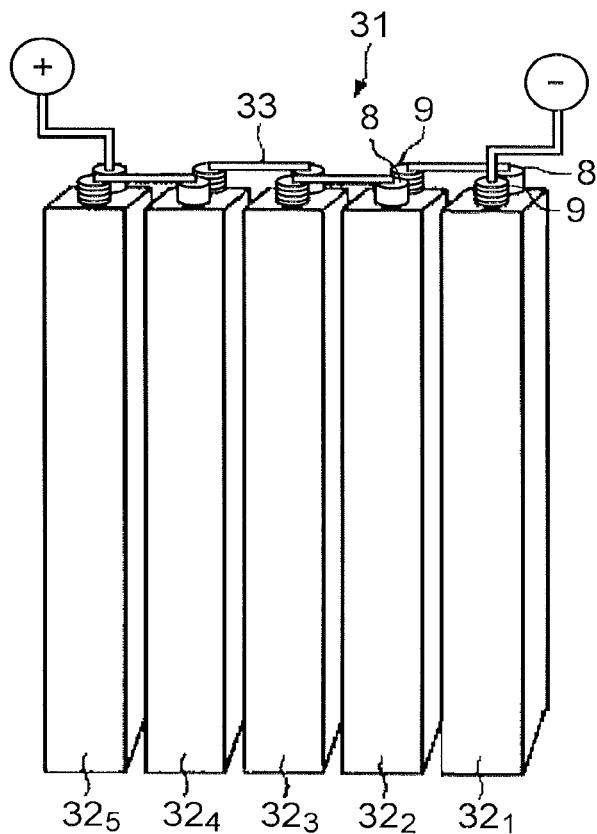
FIG. 4 is a perspective view illustrating an example of a battery module according to a second embodiment.

An example of the battery module is described with reference to FIG. 4. A battery module 31 illustrated in FIG. 4 includes, as a unit cell, a plurality of square secondary batteries (for example, FIGS. 1 and 2) $32_1$ to $32_5$ according to the first embodiment. A positive electrode conductive tab 8 of the battery $32_1$ and a negative electrode conductive tab 9 of the battery $32_2$ positioned adjacent to the battery $32_1$ are electrically connected by a lead 33. In addition, the positive electrode conductive tab 8 of the battery $32_2$ and the negative electrode conductive tab 9 of the battery $32_3$ positioned adjacent to the battery $32_2$ are electrically connected by a lead 33. The batteries $32_1$ to $32_5$ are connected in series.

According to the battery module of the second embodiment, since the battery module includes the secondary battery according to the first embodiment, it is possible to provide a battery module having an excellent storage performance and excellent cycle characteristics.

Third Embodiment

According to a third embodiment, a battery pack is provided. The battery pack includes the secondary battery according to the first embodiment.

The battery pack according to the third embodiment can include one or a plurality of secondary batteries (unit cell) according to the first embodiment described above. The plurality of secondary batteries that can be included in the battery pack according to the third embodiment can be electrically connected in series, in parallel, or in a combination of a series connection and a parallel connection. In addition, the plurality of secondary batteries can be electrically connected to form a battery module. In a case where the battery module is composed of the plurality of secondary batteries, the battery module of the second embodiment can be used.

The battery pack according to the third embodiment can include a protective circuit. The protective circuit controls charge and discharge of the secondary battery. Alternatively, a circuit included in a device (for example, an electronic device, an automobile, or the like) that is configured to use a battery pack as a power supply can be used as the protective circuit of the battery pack.

In addition, the battery pack according to the third embodiment can further include a conductive external terminal. The conductive external terminal is configured to output a current from the secondary battery to the outside and/or to input a current to a unit cell 51. In other words, when the battery pack is used as a power supply, a current is supplied to the outside via the conductive external terminal. In addition, when the battery pack is charged, a charge current (including regenerative energy of power of an automobile or the like) is supplied to the battery pack via a conductive external terminal 59.

Figure 5:
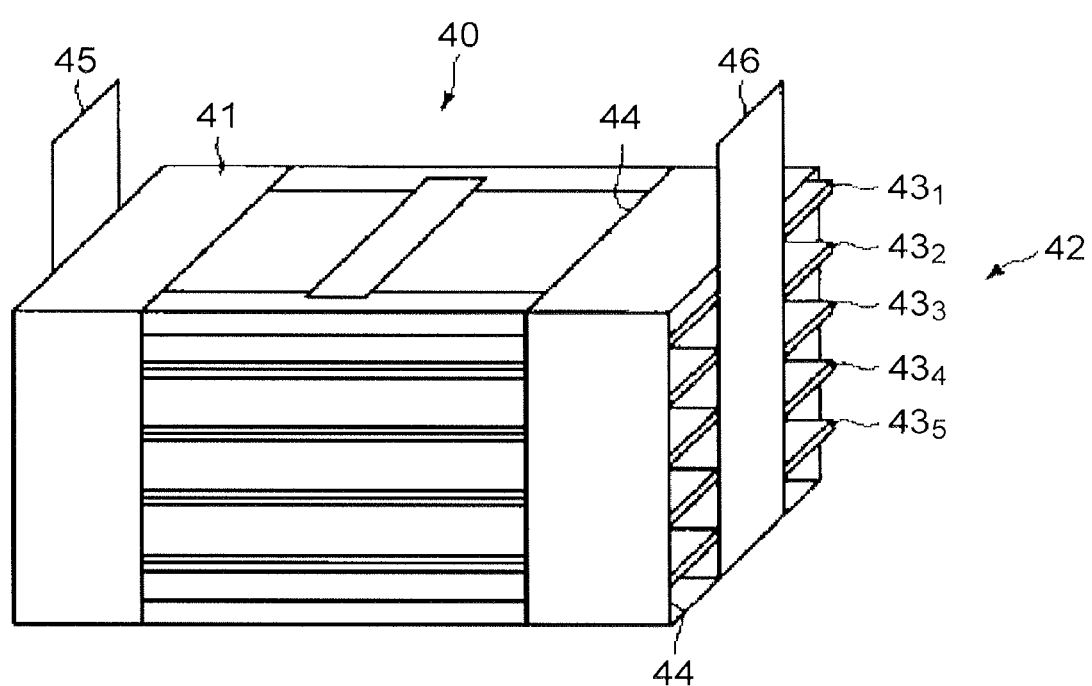
FIG. 5 is a perspective view illustrating an example of a battery pack according to a third embodiment.

An example of the battery pack according to the third embodiment will be described with reference to FIG. 5. FIG. 5 is a perspective view schematically illustrating an example of the battery pack.

A battery pack 40 includes a battery module composed of the secondary batteries illustrated in FIGS. 3 and 5. The battery pack 40 includes a case 41 and a battery module 42 housed in the case 41. The battery module 42 includes a plurality (for example, five) of secondary batteries $43_1$ to $43_5$ electrically connected in series. The secondary batteries $43_1$ to $43_5$ are stacked in a thickness direction. The case 41 has openings 44 provided on an upper portion and four side surfaces. The side surfaces from which positive and negative electrode terminals 12 and 13 of the secondary batteries $43_1$ to $43_5$ protrude are exposed to the openings 44 of the case 41. A positive electrode terminal 45 for output of the battery module 42 is formed in a belt shape. One end of the positive electrode terminal 45 for output is electrically connected to the positive electrode terminal 13 of one of the secondary batteries $43_1$ to $43_5$. The other end of the positive electrode terminal 45 for output protrudes from the opening 44 of the case 41 to protrude from the upper portion of the case 41. Meanwhile, a negative electrode terminal 46 for output of the battery module 42 is formed in a belt shape. One end of the negative electrode terminal 46 for output is electrically connected to the negative electrode terminal 12 of one of the secondary batteries $43_1$ to $43_5$. The other end of the negative electrode terminal 46 for output protrudes from the opening 44 of the case 41 to protrude from the upper portion of the case 41.

Figure 6:
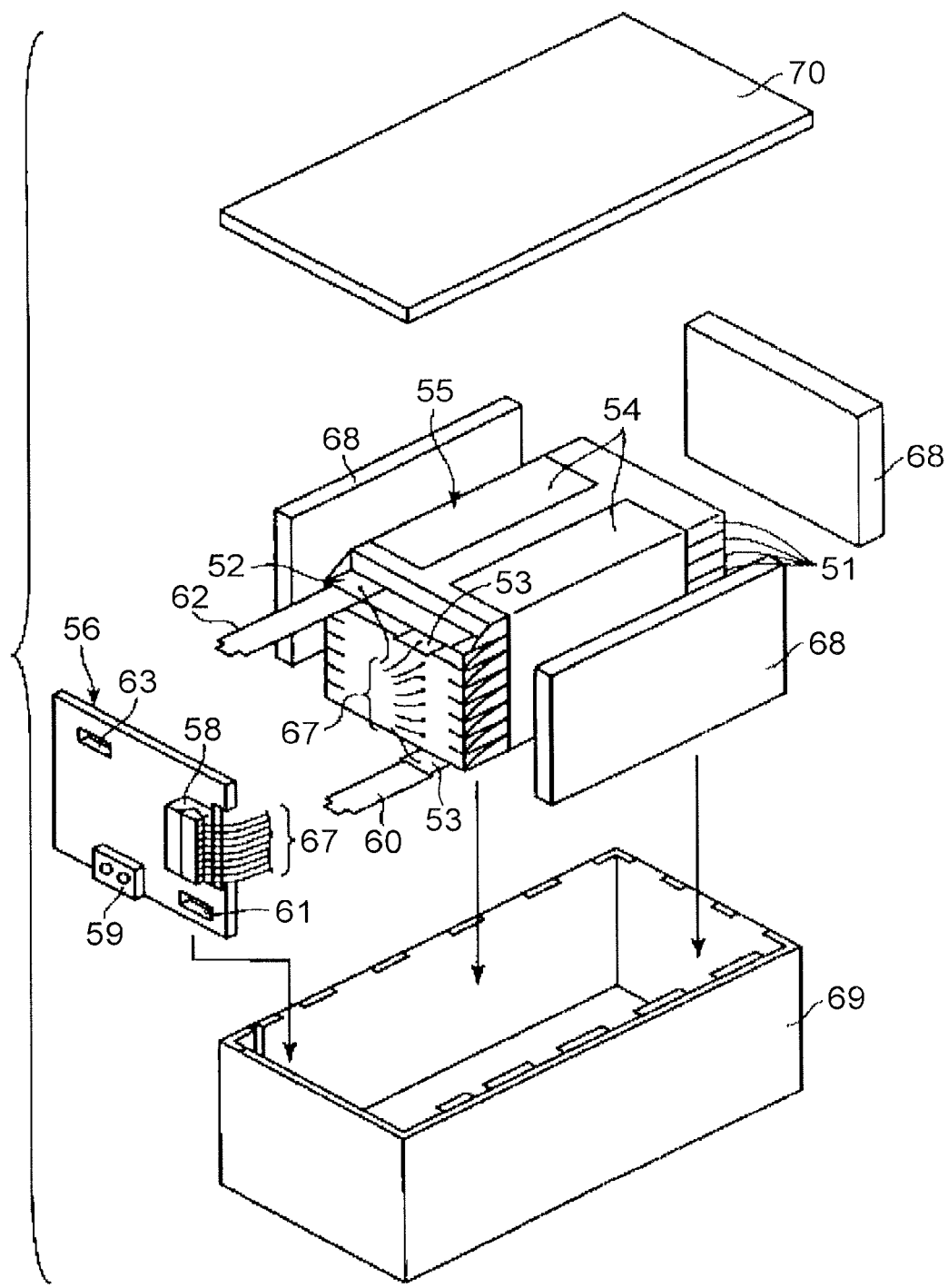
FIG. 6 is an exploded perspective view illustrating another example of the battery pack according to the third embodiment.
Figure 7:
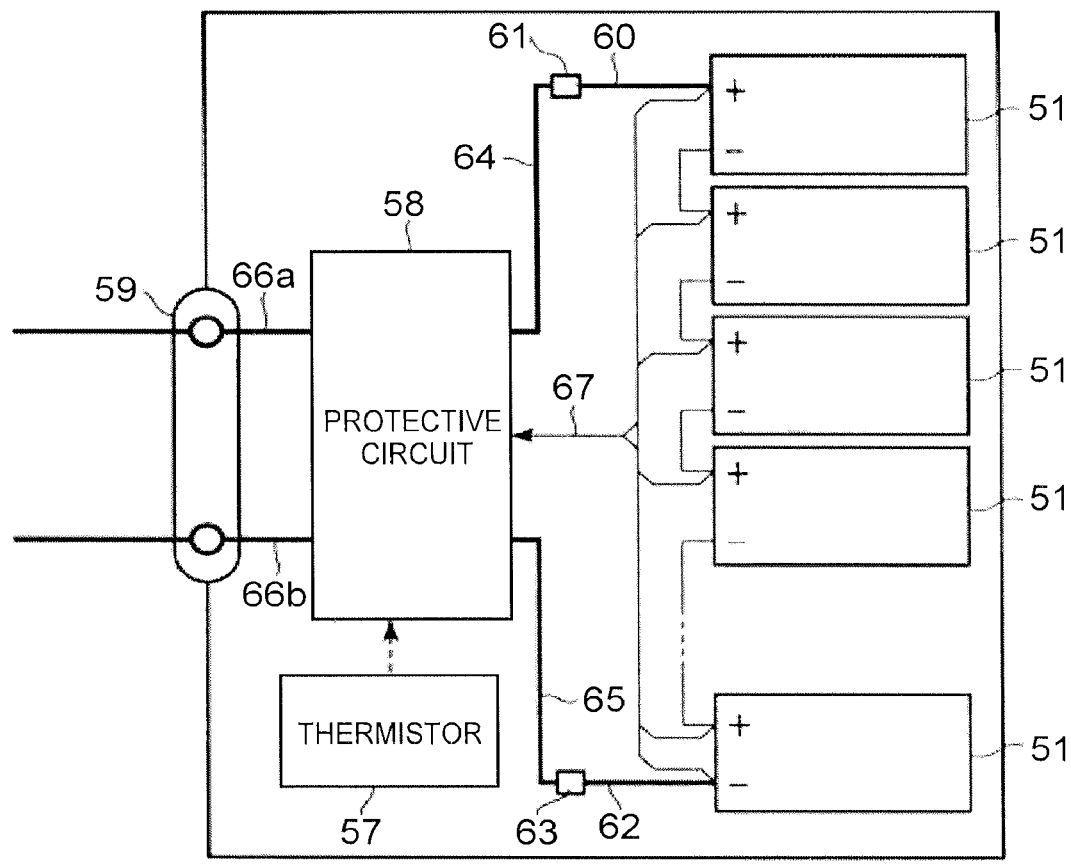
FIG. 7 is a block diagram illustrating an electric circuit of the battery pack of FIG. 6.

Another example of the battery pack according to the third embodiment will be described in detail with reference to FIGS. 6 and 7. FIG. 6 is an exploded perspective view illustrating another example of the battery pack according to the third embodiment. FIG. 7 is a block diagram illustrating an electric circuit of the battery pack of FIG. 6.

A battery module 55 is configured by stacking a plurality of unit cells 51 composed of flat secondary batteries so that a negative electrode terminal 52 and a positive electrode terminal 53 that extend outward are arranged in the same direction, and by fastening the plurality of unit cells 51 by an adhesive tape 54. The plurality of unit cells 51 are electrically connected to each other in series as illustrated in FIG. 7.

A printed wiring board 56 is disposed to face side surfaces of the unit cells 51 from which the negative electrode terminal 52 and the positive electrode terminal 53 protrude. On the printed wiring board 56, as illustrated in FIG. 7, a thermistor 57, a protective circuit 58, and a conductive external terminal 59 are installed. An insulating plate (not illustrated) is provided on a surface of the printed wiring board 56 facing the battery module 55 so as to not to be unnecessarily connected to the wiring of the battery module 55.

A positive electrode lead 60 is connected to the positive electrode terminal 53 positioned on the lowest layer of the battery module 55, and a tip end thereof is inserted into and electrically connected to a positive electrode connector 61 of the printed wiring board 56. A negative electrode lead 62 is connected to the negative electrode terminal 52 positioned on the uppermost layer of the battery module 55, and a tip end thereof is inserted into and electrically connected to a negative electrode connector 63 of the printed wiring board 56. The connectors 61 and 63 are connected to the protective circuit 58 through wirings 64 and 65 formed on the printed wiring board 56.

The thermistor 57 detects a temperature of the unit cell 51, and the detection signal is transmitted to the protective circuit 58. The protective circuit 58 can cut off a plus wiring 66a and a minus wiring 66b between the protective circuit 58 and the conductive external terminal 59 under a predetermined condition. An example of the predetermined condition can include a case where a detection temperature of the thermistor 57 is a predetermined temperature or higher. In addition, an example of the predetermined condition can include a case where the over charge, the over discharge, or the over current of the unit cell 51 is detected. The detection of the over charge or the like is performed for each unit cell 51 or for the battery module 55. In a case where detection is performed for each unit cell 51, a battery voltage may be detected, or a positive electrode potential or a negative electrode potential may be detected. In the latter case, a lithium electrode used as a reference electrode is inserted into each unit cell 51. In the case of FIGS. 6 and 7, a wiring 67 for detecting a voltage is connected to each unit cell 51, and a detection signal is transmitted to the protective circuit 58 through the wiring 67.

A protective sheet 68 formed of rubber or a resin is disposed on each of three side surfaces of the battery module 55 except for the side surface from which the positive electrode terminal 53 and the negative electrode terminal 52 protrude.

The battery module 55 is housed in a housing container 69 together with the protective sheets 68 and the printed wiring board 56. That is, the protective sheet 68 is disposed on each of both inner side surfaces of the housing container 69 in a long side direction and an inner side surface of the housing container 69 in a short side direction, and the printed wiring board 56 is disposed on an inner side surface opposite to the inner side surface on which the protective sheet 68 is disposed in the short side direction. The battery module 55 is positioned in a space surrounded by the protective sheets 68 and the printed wiring board 56. A lid 70 is provided on an upper surface of the housing container 69.

Note that a heat-shrinkable tape may also be used instead of the adhesive tape 54 to fix the battery module 55. In this case, the protective sheet is disposed on each of both side surfaces of the battery module, the battery module is enclosed by the heat-shrinkable tape, and then the heat-shrinkable tape is heat-shrunk to fasten the battery module.

FIGS. 6 and 7 illustrate a state in which the unit cells 51 are connected in series, but the unit cells 51 may be connected in parallel in order to increase the battery capacity. Alternatively, the unit cells 51 may be connected in a combination of a series connection and a parallel connection. Furthermore, the assembled battery packs can be connected in series or in parallel.

In addition, an aspect of the battery pack is adequately modified depending on an application thereof. The battery pack is preferably used in applications in which charge and discharge under a large current is desirable. Specifically, the battery pack may be used as a power supply for a digital camera, or a battery for installation on a vehicle such as a two-wheeled to four-wheeled hybrid electric automobile, a two-wheeled to four-wheeled electric automobile, an assisted bicycle, or a railroad vehicle. In particular, the battery pack is preferable for installation on a vehicle.

In a vehicle in which the battery pack according to the third embodiment is installed, such as an automobile, the battery pack is configured to, for example, recover regenerative energy of power of the vehicle.

According to the battery pack of the third embodiment described above, the battery pack includes the secondary battery of the first embodiment, and thus it is possible to provide a battery pack having an excellent storage performance and excellent cycle characteristics.

Fourth Embodiment

According to a fourth embodiment, a vehicle is provided. The vehicle includes the battery pack according to the third embodiment.

In the vehicle according to the fourth embodiment, the battery pack is configured to, for example, recover regenerative energy of power of the vehicle.

Examples of the vehicle according to the fourth embodiment can include a two-wheeled to four-wheeled hybrid electric automobile, a two-wheeled to four-wheeled electric automobile, an assisted bicycle, and a railroad vehicle.

The installation position of the battery pack in the vehicle according to the fourth embodiment is not particularly limited. For example, in a case where the battery pack is installed in an automobile, the battery pack can be installed in an engine compartment of the vehicle, at a rear portion of the vehicle, or under a seat.

Next, an example of the vehicle according to the fourth embodiment will be described with reference to the drawing.

Figure 8:
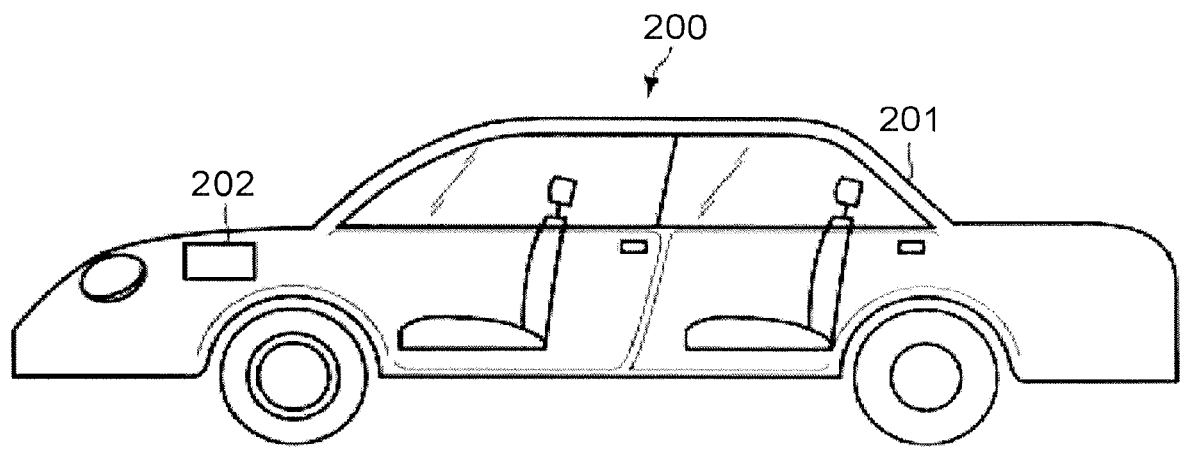
FIG. 8 is a cross-sectional view schematically illustrating an example of a vehicle according to a fourth embodiment.

FIG. 8 is a cross-sectional view schematically illustrating an example of the vehicle according to the fourth embodiment. A vehicle 200 illustrated in FIG. 8 includes a vehicle body 201 and a battery pack 202. The battery pack 202 may be the battery pack according to the third embodiment.

The vehicle 200 illustrated in FIG. 8 is a four-wheeled automobile. Examples of the vehicle 200 can include a two-wheeled to four-wheeled hybrid electric automobile, a two-wheeled to four-wheeled electric automobile, an assisted bicycle, and a railroad vehicle.

The vehicle 200 may include a plurality of battery packs 202. In this case, the battery packs 202 may be connected in series or in parallel, or may be connected in a combination of a series connection and a parallel connection.

The battery pack 202 is installed in an engine compartment positioned at a front portion of the vehicle body 201. The installation position of the battery pack 202 is not particularly limited. The battery pack 202 may be installed at a rear portion of the vehicle body 201 or under a seat. The battery pack 202 can be used as a power supply of the vehicle 200. In addition, the battery pack 202 can recover regenerative energy of power of the vehicle 200.

Next, an embodiment of the vehicle according to the fourth embodiment will be described with reference to FIG. 9.

Figure 9:
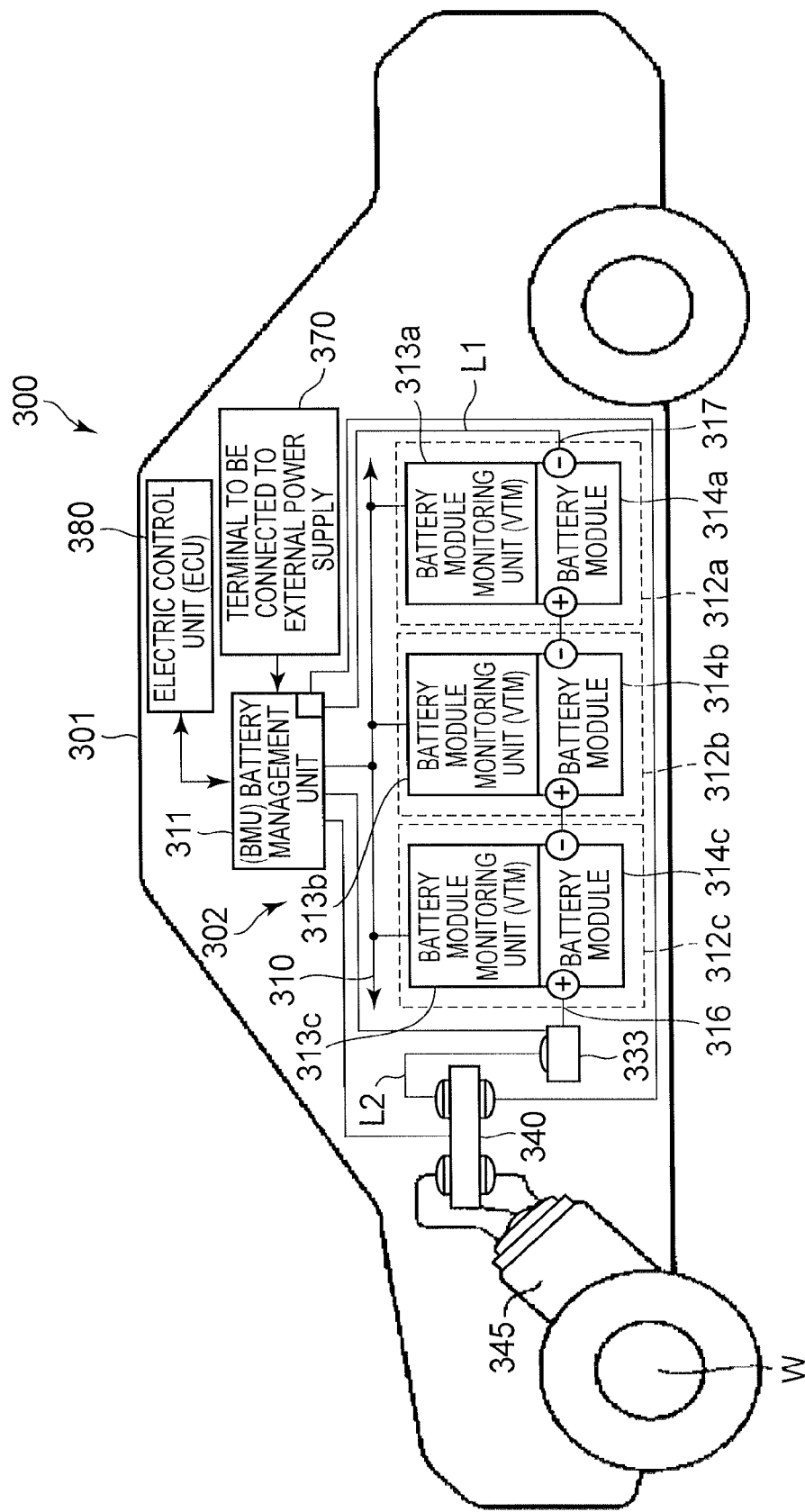
FIG. 9 is a view schematically illustrating another example of the vehicle according to the fourth embodiment.

FIG. 9 is a view schematically illustrating another example of the vehicle according to the fourth embodiment. A vehicle 300 illustrated in FIG. 9 is an electric automobile.

The vehicle 300 illustrated in FIG. 9 includes a vehicle body 301, a vehicle power supply 302, a vehicle electric control unit (ECU) 380, which is a host controller of the vehicle power supply 302, an external terminal (terminal to be connected to an external power supply) 370, an inverter 340, and a drive motor 345.

In the vehicle 300, the vehicle power supply 302 is installed, for example, in an engine compartment, at a rear portion of the vehicle body, or under a seat. A position in the vehicle 300 where the vehicle power supply 302 is installed is schematically illustrated in FIG. 9.

The vehicle power supply 302 includes a plurality (for example, three) of battery packs 312a, 312b, and 312c, a battery management unit (BMU) 311, and a communication bus 310.

Three battery packs 312a, 312b, and 312c are electrically connected in series. The battery pack 312a includes a battery module 314a and a battery module monitoring unit (voltage temperature monitoring (VTM)) 313a. The battery pack 312b includes a battery module 314b and a battery module monitoring unit 313b. The battery pack 312c includes a battery module 314c and a battery module monitoring unit 313c. The battery packs 312a, 312b, and 312c can be independently removed, and can be replaced with another battery pack 312.

Each of the battery modules 314a to 314c includes a plurality of unit cells connected in series. At least one of the plurality of unit cells is the secondary battery according to the first embodiment. Each of the battery modules 314a to 314c performs charge and discharge via a positive electrode terminal 316 and a negative electrode terminal 317.

In order to collect information on maintenance of the vehicle power supply 302, the battery management unit 311 performs communication with the battery module monitoring units 313a to 313c, and collects information such as voltages and temperatures of the unit cells included in the battery modules 314a to 314c included in the vehicle power supply 302.

The communication bus 310 is connected between the battery management unit 311 and the battery module monitoring units 313a to 313c. The communication bus 310 is configured so that a plurality of nodes (the battery management unit and one or more of the battery module monitoring units) shares a set of communication lines. The communication bus 310 is, for example, a communication bus configured based on the control area network (CAN) standard.

The battery module monitoring units 313a to 313c measure the voltages and temperatures of the unit cells constituting the battery modules 314a to 314c based on a command communicated from the battery management unit 311. However, it is possible to measure the temperature only at several points of one battery module, and it is not necessary to measure the temperatures of all of the unit cells.

The vehicle power supply 302 can also include an electromagnetic contactor (for example, a switch device 333 illustrated in FIG. 9) for switching connection between the positive electrode terminal 316 and the negative electrode terminal 317. The switch device 333 includes a precharge switch (not illustrated), which is turned on when the battery modules 314a to 314c are charged, and a main switch (not illustrated), which is turned on when a battery output is supplied to a load. The precharge switch and the main switch include a relay circuit (not illustrated), which is turned on or off based on a signal provided to a coil disposed in the vicinity of switch elements.

The inverter 340 converts an input direct current voltage to a three-phase alternating current (AC) with a high voltage for driving a motor. Three-phase output terminals of the inverter 340 are connected to three-phase input terminals of the drive motor 345, respectively. The inverter 340 controls an output voltage based on control signals from the battery management unit 311 or the vehicle ECU 380 controlling the entire operation of the vehicle.

The drive motor 345 is rotated by electric power supplied from the inverter 340. The rotation is transferred, for example, to an axle and driving wheels W via a differential gear unit.

In addition, although not illustrated, the vehicle 300 includes a regenerative brake mechanism. The regenerative brake mechanism rotates the drive motor 345 when the vehicle 300 brakes and converts kinetic energy to regenerative energy as electric energy. The regenerative energy recovered in the regenerative brake mechanism is input to the inverter 340 and converted to a direct current. The direct current is input to the vehicle power supply 302.

One terminal of a connection line L1 is connected to the negative electrode terminal 317 of the vehicle power supply 302 via a current detector (not illustrated) in the battery management unit 311. The other terminal of the connection line L1 is connected to a negative electrode input terminal of the inverter 340.

One terminal of a connection line L2 is connected to the positive electrode terminal 316 of the vehicle power supply 302 via the switch device 333. The other terminal of the connection line L2 is connected to a positive electrode input terminal of the inverter 340.

An external terminal 370 is connected to the battery management unit 311. The external terminal 370 can be connected to, for example, an external power supply.

The vehicle ECU 380 controls the battery management unit 311 cooperatively together with other units in response to an input operated by a driver or the like, thereby performing the management of the entire vehicle. Data on the maintenance of the vehicle power supply 302, such as a remaining capacity of the vehicle power supply 302, is transferred between the battery management unit 311 and the vehicle ECU 380 via communication lines.

The vehicle according to the fourth embodiment includes the battery pack according to the third embodiment. That is, since the vehicle according to the fourth embodiment includes the battery pack having an excellent storage performance and excellent cycle characteristics, the vehicle according to the fourth embodiment has an excellent storage performance and excellent cycle characteristics, and the battery pack has an excellent lifespan performance. Therefore, a vehicle having a high reliability can be provided.

Fifth Embodiment

According to a fifth embodiment, a stationary power supply is provided. The stationary power supply includes the battery pack according to the third embodiment. Note that the stationary power supply may include the battery module according to the second embodiment or the secondary battery according to the first embodiment, instead of the battery pack according to the third embodiment.

The stationary power supply according to the fifth embodiment includes the battery pack according to the third embodiment. Therefore, the stationary power supply according to the fifth embodiment can implement a long lifespan.

Figure 10:
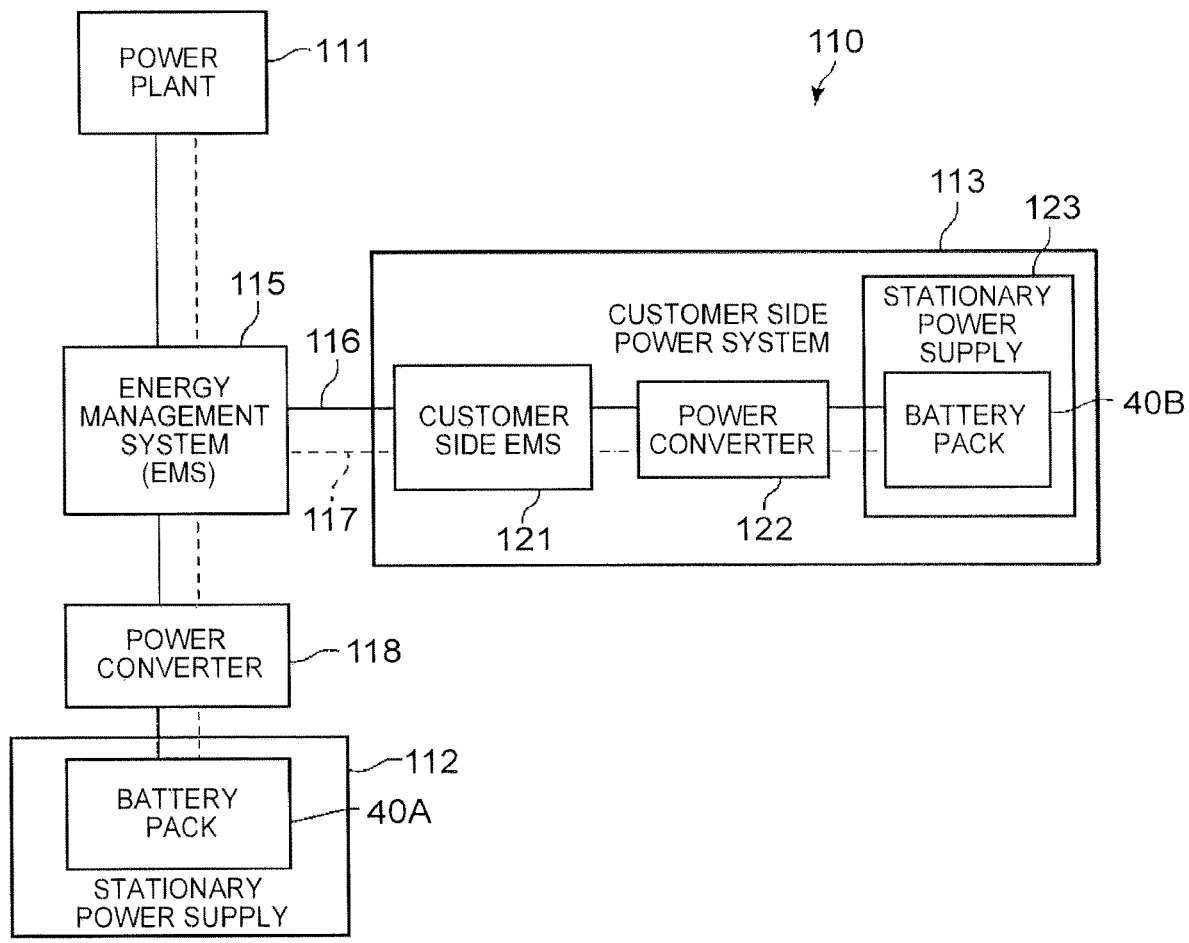
FIG. 10 is a block diagram illustrating an example of a system including a stationary power supply according to a fifth embodiment.

FIG. 10 is a block diagram illustrating an example of a system including the stationary power supply according to the fifth embodiment. FIG. 10 is a diagram illustrating an example applied to stationary power supplies 112 and 123 as an example of use of battery packs 40A and 40B according to the third embodiment. In the example illustrated in FIG. 10, a system 110 in which the stationary power supplies 112 and 123 are used is illustrated. The system 110 includes a power plant 111, the stationary power supply 112, a customer side power system 113, and an energy management system (EMS) 115. In addition, a power network 116 and a communication network 117 are provided in the system 110, and the power plant 111, the stationary power supply 112, the customer side power system 113, and the EMS 115 are connected via the power network 116 and the communication network 117. The EMS 115 performs control to stabilize the entire system 110 by utilizing the power network 116 and the communication network 117.

The power plant 111 generates power with a large capacity from a fuel source such as thermal power or nuclear power. Power is supplied from the power plant 111 via the power network 116 and the like. In addition, the battery pack 40A is installed in the stationary power supply 112. The battery pack 40A can store the power supplied from the power plant 111. In addition, the stationary power supply 112 can supply the power stored in the battery pack 40A via the power network 116 and the like. A power converter 118 is provided in the system 110. The power converter 118 includes a converter, an inverter, a transformer, and the like. Accordingly, the power converter 118 can perform conversion between a direct current and an alternating current, conversion between alternating currents with frequencies different from each other, voltage transformation (step-up and step-down), and the like. Therefore, the power converter 118 can convert the power supplied from the power plant 111 into power that can be stored in the battery pack 40A.

Examples of the customer side power system 113 include a power system for a factory, a power system for a building, and a power system for home use. The customer side power system 113 includes a customer side EMS 121, a power converter 122, and the stationary power supply 123. The battery pack 40B is installed in the stationary power supply 123. The customer side EMS 121 performs control to stabilize the customer side power system 113.

Power supplied from the power plant 111 and power supplied from the battery pack 40A are supplied to the customer side power system 113 via the power network 116. The battery pack 40B can store the power supplied to the customer side power system 113. Similarly to the power converter 118, the power converter 122 includes a converter, an inverter, a transformer, and the like. Accordingly, the power converter 122 can perform conversion between a direct current and an alternating current, conversion between currents with frequencies different from each other, voltage transformation (step-up and step-down), and the like. Therefore, the power converter 122 can convert the power supplied to the customer side power system 113 into power that can be stored in the battery pack 40B.

Note that the power stored in the battery pack 40B can be used, for example, for charging a vehicle such as an electric automobile. In addition, the system 110 may also include a natural energy source. In this case, the natural energy source generates power by natural energy such as wind power and solar light. In addition to the power plant 111, power is also supplied from the natural energy source via the power network 116.

Hereinafter, examples will be described, but the embodiments are not limited to the examples described below. In a secondary battery using an aqueous electrolyte, it is not possible to raise the generated voltage by using only one type of electrolyte. In the following examples, experiments were conducted while changing the concentrations of the aqueous electrolyte of the positive electrode side and the aqueous electrolyte of the negative electrode side.

EXAMPLE 1

A secondary battery was produced by the following procedure.

<Production of Positive Electrode>

A positive electrode was produced as follows. 5 g of $LiMn_2O_4$ as a positive electrode active material, 0.25 g of acetylene black as a conductive agent, and 6.25 g of a PVDF dispersion (NMP solution of which a solid content ratio is 8%) as a binder (binder resin) were mixed for 3 minutes with a kneader, thereby obtaining a viscous slurry. The slurry was coated on one surface of a Ti foil. Thereafter, a solvent was distilled off at 120° C., thereby obtaining a laminate. Next, the laminate was pressed with a roll press. Thereafter, the laminate was dried and then punched into a circular shape having a diameter of 10 mm. A weight per area of the obtained positive electrode was 116 $g/m^2$.

<Production of Negative Electrode>

10 g of $Li_4Ti_5O_{12}$ as a negative electrode active material, 1 g of graphite as a conductive agent, 1 g of a PTFE dispersion (solid content: 40 wt %) as a binder (binder resin), and 8 g of N-methyl-2-pyrrolidone (NMP) were mixed for 3 minutes with a kneader, thereby obtaining a slurry. The slurry was coated on one surface of a Zn foil. Thereafter, a solvent was distilled off at 120° C., thereby obtaining a laminate. Next, the laminate was pressed with a roll press. Thereafter, the laminate was dried and then punched into a circular shape having a diameter of 10 mm. A weight per area of the obtained negative electrode was 35 $g/m^2$.

<Adjustment of Aqueous Electrolyte>

An aqueous electrolyte of the positive electrode and an aqueous electrolyte of the negative electrode were adjusted by using a lithium salt concentration, an osmotic pressure regulator, and a surfactant in each of the aqueous electrolyte of the positive electrode and the aqueous electrolyte of the negative electrode shown in Tables 5 and 6.

<Surfactant>

As a specific example of a nonionic surfactant, it is possible to use one or more selected from the group consisting of polyoxyethylene alkyl ether (for example, $C_{12}H_{25}O(CH_2CH_2O)nH$; $0.9<n\leq2.1$) and polyoxyalkylene alkyl ether (for example, $C_{12}H_{25}O[(CH_2CH(CH_3)O)m\cdot(CH_2CH_2O)n]H$; $0<n\leq35$ and $0<m\leq40$, or $C_4H_9O(CH_2CH_2O)n[(CH_2CH(CH_3)O)m]H$; $0<n\leq35$ and $0<m\leq28$). In a formula $C_{12}H_{25}O(CH_2CH_2O)nH$ of polyoxyethylene alkyl ether, the numerical range of the subscript n include $0.89<n\leq2.1$. In addition, a specific example of polyoxyalkylene alkyl ether represented by a formula $C_{12}H_{25}O[(CH_2CH(CH_3)O)m.(CH_2CH_2O)n]H$ can include a compound of which the subscript n and m are $1.4\leq n\leq35$ and $8.4\leq m\leq40$. In the examples, polyoxyalkylene alkyl ether $(C_{12}H_{25}O[(CH_2CH(CH_3)O)m\cdot(CH_2CH_2O)n]H$; $0<n\leq35$ and $0<m\leq40$) was used. Here, a surfactant of which a molecular weight is 2,000, n is 10, and m is 40 was defined as A, a surfactant of which a molecular weight is 500, n is 1.4, and m is 8.4 was defined as B, a surfactant of which a molecular weight is 3,238, n is 35, and m is 28 was defined as C, and a surfactant of which a molecular weight is 2,000, n is 10, and m is 30 was defined as D, and these surfactants were used. In Example 1, the surfactant A was used.

<Production of Test Battery>

An aluminum plate subjected to an anodization treatment was fixed onto a plastic plate, and the negative electrode was fixed thereon. A Ti plate was fixed onto another plastic plate, and the positive electrode was fixed thereon. On the negative electrode, the prepared aqueous electrolyte of the negative electrode side was added dropwise, and a separator was placed thereon and brought into close contact therewith. The aqueous electrolyte of the positive electrode side was added dropwise on a reverse side of the separator. The positive electrode was placed thereon and brought into close contact therewith, and further fixed with a screw. The following measurement was performed on the produced secondary battery.

<Osmotic Pressure Measurement>

The osmotic pressure of a battery after a constant current charge and discharge test was measured. A volume of the solvent in the electrolyte was defined as V ($m^3$), the amount of substance (total number of moles) of the solute in the electrolyte was defined as n (mol), a gas constant is R ($m^2$ kg/($s^2$·K·mol)), and an absolute temperature of the electrolyte was defined as T (K), thereby calculating the osmotic pressure. The results are shown in Tables 5 and 6.

<Gas Permeability Measurement>

The battery was disassembled and the separator was separated from other parts of the battery. Both surfaces of the separator were washed with pure water, immersed in pure water, and then allowed to stand for 48 hours or longer.

Thereafter, both the surfaces were further washed with pure water, and dried in a vacuum dryer at 100° C. for 48 hours or longer, and then the gas permeability (air permeability) was measured. The separator was taken out, and thicknesses (m) of the separator were measured at four points thereof. At each of the four measured points, the separator was interposed between a pair of stainless steel plates each having an opened hole with a diameter of 10 mm, and air was fed at a pressure p through the hole of one stainless steel plate. As the pressure p, 1,000 Pa, 2,500 Pa, 4,000 Pa, and 6,000 Pa were used. Then, the amount of gas Q of the air leaking from the hole of the other stainless steel plate was measured. An area ($25\pi$ mm$^2$) of the hole was defined as a measuring area A, and 0.000018 Pa·s was used as a viscosity coefficient σ. The amount of gas Q was calculated by measuring the amount δ (m$^3$) of gas leaking from the hole during 100 seconds, and dividing the measured amount δ by 100.

The amount of gas Q was plotted with respect to the pressure p at each of the four measured points, and the slope (dQ/dp) of the amount of gas Q with respect to the pressure p was calculated by straight line fitting (least-squares method). Then, the gas permeability KT was calculated by multiplying the calculated slope (dQ/dp) by (σ·L)/A. Then, a value measured at a portion at which the gas permeability is smallest among the four points was taken as the gas permeability of the separator. The gas permeability is shown in Tables 5 and 6.

The types and concentrations of the lithium salts, the types and concentrations of the osmotic pressure regulators (inorganic compound or organic compound), and the types and concentrations of the surfactants in the aqueous electrolyte of the positive electrode side and the aqueous electrolyte of the negative electrode side are shown in Tables 3 and 4. The interfacial tensions (mN/m) and the osmotic pressures (N/m$^2$) of the aqueous electrolyte of the positive electrode side and the aqueous electrolyte of the negative electrode side, the gas permeability (air permeability) (m$^2$) of the separator, the osmotic pressure difference (%), the cycle characteristics (cycle), and the coulombic efficiency (%) are shown in Tables 5 and 6. In Examples 2 to 44 and Comparative Examples 1 and 2 described below, measurements were performed in the same manner as that of Example 1.

<Constant Current Charge and Discharge Test>

In each example and each comparative example, a test battery was produced, and then a test was rapidly initiated without the waiting time. Both charging and discharging were performed at a rate of 0.5 C. In addition, at the time of charging, the shortest time among the time taken until a current value reaches 0.25 C, the time taken until a charge time reaches 130 minutes, and the time taken until a charge capacity reaches 170 mAh/g was set as a termination condition. At the time of discharging, the time after 130 minutes have passed was set as the termination condition.

A process in which the above charging is performed once and the above discharging is performed once was set as one cycle of the charging and discharging, a discharge capacity at 50$^{th}$ cycle was taken as 100%. The cycle was repeated, and the number of cycles at which the discharge capacity is to 80% of the discharge capacity at the 50$^{th}$ cycle was defined as cycle characteristics. In addition, the coulombic efficiency was calculated from a charge capacity and the discharge capacity at the 50$^{th}$ cycle by the following method. The higher the coulombic efficiency, the better the storage performance. Therefore, the storage performance was measured by using the coulombic efficiency. Since the coulombic efficiency is stable at the 50$^{th}$ cycle, the 50$^{th}$ cycle was used. Coulombic efficiency (%)=100×(charge capacity/discharge capacity)

As shown in Table 3, in each of Examples 2 to 20, a secondary battery was produced in the same manner as that of Example 1 by adjusting the lithium salt concentration, the osmotic pressure regulator (a compound capable of regulating an osmotic pressure), and the surfactant in each of the aqueous electrolytes of the positive electrode side and the negative electrode side. The interfacial tension measurement, the osmotic pressure measurement, the osmotic pressure difference measurement, the cycle characteristics, and the coulombic efficiency were evaluated. The evaluation results are shown in Table 5. As shown in Table 4, in each of Example 21 to 44 and Comparative Examples 1 and 2, a secondary battery was produced in the same manner as that of Example 1 by adjusting the lithium salt concentration, the osmotic pressure regulator, and the surfactant in each of the aqueous electrolytes of the positive electrode side and the negative electrode side. The interfacial tension measurement, the osmotic pressure measurement, the osmotic pressure difference measurement, the cycle characteristics, and the coulombic efficiency were evaluated. The evaluation results are shown in Table 6. In the table, "-" means that a component is not added.

[Tables 3 to 6]

TABLE 3

| | | Aqueous electrolyte of positive electrode | | |
| --- | --- | --- | --- | --- |
| | Lithium salt Type: concentration (mol/L) | Osmotic pressure regulator 1 Type: concentration (mol/L) | Osmotic pressure regulator 2 Type: concentration (mol/L) | Surfactant Type: mass (wt %) |
| Example 1 | Li$_2$SO$_4$: 0.5 mol/L | — | — | A: 1 wt % |
| Example 2 | Li$_2$SO$_4$: 1 mol/L | — | — | A: 1 wt % |
| Example 3 | Li$_2$SO$_4$: 1.5 mol/L | — | — | A: 1 wt % |
| Example 4 | Li$_2$SO$_4$: 1.5 mol/L | NaCl: 1 mol/L | — | A: 1 wt % |
| Example 5 | Li$_2$SO$_4$: 0.5 mol/L | NaCl: 2.5 mol/L | — | A: 1 wt % |
| Example 6 | Li$_2$SO$_4$: 1 mol/L | NaCl: 1.75 mol/L | — | A: 1 wt % |
| Example 7 | Li$_2$SO$_4$: 1.5 mol/L | NaCl: 1 mol/L | — | A: 1 wt % |
| Example 8 | Li$_2$SO$_4$: 1.5 mol/L | NaCl: 1 mol/L | — | A: 1 wt % |
| Example 9 | Li$_2$SO$_4$: 1 mol/L | NaCl: 1 mol/L | — | A: 1 wt % |
| Example 10 | Li$_2$SO$_4$: 1 mol/L | NaCl: 1 mol/L | ZnCl 1 mol/L | A: 1 wt % |
| Example 11 | Li$_2$SO$_4$: 1 mol/L | NaCl: 1 mol/L | Na$_2$SO$_4$ 1 mol/L | A: 1 wt % |
| Example 12 | Li$_2$SO$_4$: 1 mol/L | NaCl: 1 mol/L | — | A: 3 wt % |
| Example 13 | Li$_2$SO$_4$: 1 mol/L | NaCl: 1 mol/L | — | A: 5 wt % |

TABLE 3-continued

| | Lithium salt Type: concentration (mol/L) | Osmotic pressure regulator 1 Type: concentration (mol/L) | Osmotic pressure regulator 2 Type: concentration (mol/L) | Surfactant Type: mass (wt %) |
|---|---|---|---|---|
| Example 14 | LiCl: 6 mol/L | — | — | — |
| Example 15 | LiCl: 6 mol/L | — | — | — |
| Example 16 | LiCl: 6 mol/L | — | — | — |
| Example 17 | LiCl: 6 mol/L | — | — | — |
| Example 18 | Li$_2$SO$_4$: 1 mol/L | NaCl: 1 mol/L | — | B: 1 wt % |
| Example 19 | Li$_2$SO$_4$: 1 mol/L | NaCl: 1 mol/L | — | C: 1 wt % |
| Example 20 | Li$_2$SO$_4$: 1 mol/L | NaCl: 1 mol/L | — | D: 1 wt % |

| | Aqueous electrolyte of negative electrode | | | |
|---|---|---|---|---|
| | Lithium salt Type: concentration (mol/L) | Osmotic pressure regulator 1 Type: concentration (mol/L) | Osmotic pressure regulator 2 Type: concentration (mol/L) | Surfactant Type: mass (wt %) |
| Example 1 | LiCl: 6 mol/L | — | — | — |
| Example 2 | LiCl: 6 mol/L | — | — | — |
| Example 3 | LiCl: 6 mol/L | — | — | — |
| Example 4 | LiCl: 6 mol/L | — | — | — |
| Example 5 | LiCl: 6 mol/L | — | — | — |
| Example 6 | LiCl: 6 mol/L | — | — | — |
| Example 7 | LiCl: 6 mol/L | — | — | — |
| Example 8 | LiCl: 6 mol/L | — | — | — |
| Example 9 | LiCl: 6 mol/L | — | — | — |
| Example 10 | LiCl: 6 mol/L | — | — | — |
| Example 11 | LiCl: 6 mol/L | — | — | — |
| Example 12 | LiCl: 6 mol/L | — | — | A: 1 wt % |
| Example 13 | LiCl: 6 mol/L | — | — | A: 3 wt % |
| Example 14 | Li$_2$SO$_4$: 1.5 mol/L | — | — | A: 1 wt % |
| Example 15 | Li$_2$SO$_4$: 1.5 mol/L | NaCl: 1 mol/L | — | A: 1 wt % |
| Example 16 | Li$_2$SO$_4$: 0.5 mol/L | NaCl: 2.5 mol/L | — | A: 1 wt % |
| Example 17 | Li$_2$SO$_4$: 1 mol/L | NaCl: 1 mol/L | ZnCl: 1 mol/L | A: 1 wt % |
| Example 18 | LiCl: 6 mol/L | — | — | — |
| Example 19 | LiCl: 6 mol/L | — | — | — |
| Example 20 | LiCl: 6 mol/L | — | — | — |

TABLE 4

| | Aqueous electrolyte of positive electrode | | | |
|---|---|---|---|---|
| | Lithium salt Type: concentration (mol/L) | Osmotic pressure regulator 1 Type: concentration (mol/L) | Osmotic pressure regulator 2 Type: concentration (mol/L) | Surfactant Type: mass (wt %) |
| Example 21 | LiNO$_3$: 1 mol/L | NaCl: 1 mol/L | — | A: 1 wt % |
| Example 22 | LiCl: 1 mol/L | NaCl: 1 mol/L | — | A: 1 wt % |
| Example 23 | Li$_2$SO$_4$: 1 mol/L | NaCl: 1 mol/L | — | A: 1 wt % |
| Example 24 | Li$_2$SO$_4$: 1 mol/L | NaCl: 1 mol/L | — | A: 1 wt % |
| Example 25 | Li$_2$SO$_4$: 1 mol/L | ZnCl: 1 mol/L | — | A: 1 wt % |
| Example 26 | Li$_2$SO$_4$: 1 mol/L | KCl: 1 mol/L | — | A: 1 wt % |
| Example 27 | Li$_2$SO$_4$: 1 mol/L | Na$_2$SO$_4$: 1 mol/L | — | A: 1 wt % |
| Example 28 | Li$_2$SO$_4$: 1 mol/L | H$_2$SO$_4$: 1 mol/L | — | A: 1 wt % |
| Example 29 | Li$_2$SO$_4$: 1 mol/L | HNO$_3$: 1 mol/L | — | A: 1 wt % |
| Example 30 | Li$_2$SO$_4$: 1 mol/L | KNO$_3$: 1 mol/L | — | A: 1 wt % |
| Example 31 | Li$_2$SO$_4$: 1 mol/L | NaNO$_3$: 1 mol/L | — | A: 1 wt % |
| Example 32 | Li$_2$SO$_4$: 1 mol/L | ethanol: 1 mol/L | — | A: 1 wt % |
| Example 33 | Li$_2$SO$_4$: 1 mol/L | dimethyl carbonate: 1 mol/L | — | A: 1 wt % |
| Example 34 | Li$_2$SO$_4$: 1 mol/L | ethylene glycol: 1 mol/L | — | A: 1 wt % |
| Example 35 | Li$_2$SO$_4$: 1 mol/L | N-methyl-2-pyrrolidone: 1 mol/L | — | A: 1 wt % |
| Example 36 | Li$_2$SO$_4$: 1 mol/L | methyl ethyl ketone: 1 mol/L | — | A: 1 wt % |
| Example 37 | Li$_2$SO$_4$: 2 mol/L | — | — | — |
| Example 38 | Li$_2$SO$_4$: 2 mol/L | — | — | — |
| Example 39 | Li$_2$SO$_4$: 1 mol/L | NaCl: 3.5 mol/L | — | A: 1 wt % |
| Example 40 | Li$_2$SO$_4$: 1 mol/L | NaCl: 5 mol/L | — | A: 1 wt % |
| Example 41 | Li$_2$SO$_4$: 1 mol/L | NaCl: 7 mol/L | — | A: 1 wt % |
| Example 42 | LiCl: 9 mol/L | — | — | — |
| Example 43 | LiCl: 9 mol/L | — | — | — |
| Example 44 | LiCl: 9 mol/L | — | — | — |

TABLE 4-continued

| | Lithium salt Type: concentration (mol/L) | Osmotic pressure regulator 1 Type: concentration (mol/L) | Osmotic pressure regulator 2 Type: concentration (mol/L) | Surfactant Type: mass (wt %) |
|---|---|---|---|---|
| Comparative Example 1 | Li$_2$SO$_4$: 0.5 mol/L | — | — | — |
| Comparative Example 2 | Li$_2$SO$_4$: 0.5 mol/L | — | — | A: 1 wt % |

Aqueous electrolyte of negative electrode

| | Lithium salt Type: concentration (mol/L) | Osmotic pressure regulator 1 Type: concentration (mol/L) | Osmotic pressure regulator 2 Type: concentration (mol/L) | Surfactant Type: mass (wt %) |
|---|---|---|---|---|
| Example 21 | LiCl: 6 mol/L | — | — | — |
| Example 22 | LiCl: 6 mol/L | — | — | — |
| Example 23 | LiNO$_3$: 6 mol/L | — | — | — |
| Example 24 | Li$_2$SO$_4$: 2 mol/L | — | — | — |
| Example 25 | LiCl: 6 mol/L | — | — | — |
| Example 26 | LiCl: 6 mol/L | — | — | — |
| Example 27 | LiCl: 6 mol/L | — | — | — |
| Example 28 | LiCl: 6 mol/L | — | — | — |
| Example 29 | LiCl: 6 mol/L | — | — | — |
| Example 30 | LiCl: 6 mol/L | — | — | — |
| Example 31 | LiCl: 6 mol/L | — | — | — |
| Example 32 | LiCl: 6 mol/L | — | — | — |
| Example 33 | LiCl: 6 mol/L | — | — | — |
| Example 34 | LiCl: 6 mol/L | — | — | — |
| Example 35 | LiCl: 6 mol/L | — | — | — |
| Example 36 | LiCl: 6 mol/L | — | — | — |
| Example 37 | LiCl: 6 mol/L | — | — | — |
| Example 38 | LiCl: 6 mol/L | — | — | — |
| Example 39 | LiCl: 10 mol/L | — | — | — |
| Example 40 | LiCl: 10 mol/L | — | — | — |
| Example 41 | LiCl: 10 mol/L | — | — | — |
| Example 42 | LiCl: 6 mol/L | NaCl: 0.2 mol/L | — | A: 1 wt % |
| Example 43 | LiCl: 6 mol/L | NaCl: 0.6 mol/L | — | A: 1 wt % |
| Example 44 | LiCl: 6 mol/L | NaCl: 1 mol/L | — | A: 1 wt % |
| Comparative Example 1 | LiCl: 8 mol/L | — | — | — |
| Comparative Example 2 | LiCl: 8 mol/L | — | — | — |

TABLE 5

| | Aqueous electrolyte of positive electrode | | Aqueous electrolyte of negative electrode | | Separator | Characteristics | | |
|---|---|---|---|---|---|---|---|---|
| | Interfacial tension (mN/m) | Osmotic pressure (N/m$^2$) | Interfacial tension (mN/m) | Osmotic pressure (N/m$^2$) | Gas permeability (m$^2$) | Osmotic pressure difference (%) | Cycle characteristics (cycle) | Coulombic efficiency (%) |
| Example 1 | 50 | 1.5 | 48 | 12 | 1 × 10$^{-16}$ | 88 | 500 | 90 |
| Example 2 | 50 | 3 | 48 | 12 | 1 × 10$^{-16}$ | 75 | 500 | 90 |
| Example 3 | 50 | 4.5 | 48 | 12 | 1 × 10$^{-16}$ | 63 | 1000 | 92 |
| Example 4 | 50 | 6.5 | 48 | 12 | 1 × 10$^{-16}$ | 46 | 1500 | 95 |
| Example 5 | 50 | 6.5 | 48 | 12 | 1 × 10$^{-16}$ | 46 | 1500 | 95 |
| Example 6 | 50 | 6.5 | 48 | 12 | 1 × 10$^{-16}$ | 46 | 1500 | 95 |
| Example 7 | 50 | 6.5 | 48 | 12 | 1 × 10$^{-17}$ | 46 | 2000 | 95.5 |
| Example 8 | 50 | 6.5 | 48 | 12 | 1 × 10$^{-18}$ | 46 | 2200 | 96 |
| Example 9 | 50 | 5 | 48 | 12 | 1 × 10$^{-16}$ | 58 | 1200 | 93 |
| Example 10 | 50 | 7 | 48 | 12 | 1 × 10$^{-16}$ | 42 | 2300 | 96 |
| Example 11 | 50 | 8 | 48 | 12 | 1 × 10$^{-16}$ | 33 | 2400 | 96.5 |
| Example 12 | 45 | 5 | 43 | 12 | 1 × 10$^{-16}$ | 58 | 1300 | 93.5 |
| Example 13 | 40 | 5 | 40 | 12 | 1 × 10$^{-14}$ | 58 | 1500 | 95 |
| Example 14 | 48 | 12 | 50 | 4.5 | 1 × 10$^{-16}$ | 63 | 300 | 70 |
| Example 15 | 48 | 12 | 50 | 6.5 | 1 × 10$^{-16}$ | 46 | 500 | 85 |
| Example 16 | 48 | 12 | 50 | 6.5 | 1 × 10$^{-16}$ | 46 | 500 | 85 |
| Example 17 | 48 | 12 | 50 | 7 | 1 × 10$^{-16}$ | 42 | 700 | 90 |
| Example 18 | 50 | 5 | 48 | 12 | 1 × 10$^{-16}$ | 58 | 1200 | 93 |
| Example 19 | 50 | 5 | 48 | 12 | 1 × 10$^{-16}$ | 58 | 1200 | 93 |
| Example 20 | 50 | 5 | 48 | 12 | 1 × 10$^{-16}$ | 58 | 1200 | 93 |

TABLE 6

|  | Aqueous electrolyte of positive electrode | | Aqueous electrolyte of negative electrode | | Separator | Characteristics | | |
|---|---|---|---|---|---|---|---|---|
|  | Interfacial tension (mN/m) | Osmotic pressure (N/m$^2$) | Interfacial tension (mN/m) | Osmotic pressure (N/m$^2$) | Gas permeability (m$^2$) | Osmotic pressure difference (%) | Cycle characteristics (cycle) | Coulombic efficiency (%) |
| Example 21 | 50 | 5 | 48 | 12 | $1 \times 10^{-16}$ | 58 | 1200 | 93 |
| Example 22 | 50 | 5 | 48 | 12 | $1 \times 10^{-16}$ | 58 | 1200 | 93 |
| Example 23 | 50 | 5 | 48 | 12 | $1 \times 10^{-16}$ | 58 | 1200 | 93 |
| Example 24 | 50 | 5 | 48 | 6 | $1 \times 10^{-16}$ | 17 | 2400 | 97 |
| Example 25 | 50 | 5 | 48 | 12 | $1 \times 10^{-16}$ | 58 | 1200 | 93 |
| Example 26 | 50 | 5 | 48 | 12 | $1 \times 10^{-16}$ | 58 | 1200 | 93 |
| Example 27 | 50 | 6 | 48 | 12 | $1 \times 10^{-16}$ | 50 | 1250 | 94 |
| Example 28 | 50 | 6 | 48 | 12 | $1 \times 10^{-16}$ | 50 | 1250 | 94 |
| Example 29 | 50 | 5 | 48 | 12 | $1 \times 10^{-16}$ | 58 | 1200 | 93 |
| Example 30 | 50 | 5 | 48 | 12 | $1 \times 10^{-16}$ | 58 | 1200 | 93 |
| Example 31 | 50 | 5 | 48 | 12 | $1 \times 10^{-16}$ | 58 | 1200 | 93 |
| Example 32 | 50 | 4 | 48 | 12 | $1 \times 10^{-16}$ | 67 | 800 | 91 |
| Example 33 | 50 | 4 | 48 | 12 | $1 \times 10^{-16}$ | 67 | 800 | 91 |
| Example 34 | 50 | 4 | 48 | 12 | $1 \times 10^{-16}$ | 67 | 800 | 91 |
| Example 35 | 50 | 4 | 48 | 12 | $1 \times 10^{-16}$ | 67 | 800 | 91 |
| Example 36 | 50 | 4 | 48 | 12 | $1 \times 10^{-16}$ | 67 | 800 | 91 |
| Example 37 | 55 | 6 | 48 | 12 | $1 \times 10^{-16}$ | 50 | 300 | 68 |
| Example 38 | 55 | 6 | 48 | 12 | $1 \times 10^{-11}$ | 50 | 200 | 62 |
| Example 39 | 50 | 10 | 48 | 20 | $1 \times 10^{-16}$ | 50 | 1800 | 94 |
| Example 40 | 50 | 13 | 48 | 20 | $1 \times 10^{-16}$ | 35 | 2300 | 96 |
| Example 41 | 50 | 17 | 48 | 20 | $1 \times 10^{-16}$ | 15 | 2500 | 97 |
| Example 42 | 48 | 18 | 43 | 12.4 | $1 \times 10^{-16}$ | 45 | 500 | 85 |
| Example 43 | 48 | 18 | 43 | 13.2 | $1 \times 10^{-16}$ | 36 | 2300 | 96 |
| Example 44 | 48 | 18 | 43 | 14 | $1 \times 10^{-16}$ | 29 | 2400 | 97 |
| Comparative Example 1 | 60 | 1.5 | 48 | 16 | $1 \times 10^{-11}$ | 91 | 100 | 50 |
| Comparative Example 2 | 50 | 1.5 | 48 | 16 | $1 \times 10^{-16}$ | 91 | 125 | 57 |

Comparing Examples 1 to 44 with Comparative Examples 1 and 2, it can be appreciated that when the osmotic pressure difference is higher than 90%, the cycle characteristics and the coulombic efficiency were reduced. It is considered that because the aqueous electrolyte of the positive electrode and the aqueous electrolyte of the negative electrode were mixed, the pH of the aqueous electrolyte was out of the appropriate pH range, and thus electrolysis of water occurred.

In addition, in Examples 37 and 38, the osmotic pressure difference was 90% or lower, but the cycle characteristics and the coulombic efficiency were inferior to those of other examples. It is considered that because the interfacial tension of Example 37 was more than 50 mN/m, the aqueous electrolyte was difficult to be soaked into the separator. It is considered that because the gas permeability (air permeability) of the separator of Example 38 was more than $1 \times 10^{-14}$ m$^2$, the aqueous electrolytes were mixed as compared to other examples.

It can be appreciated from the examples that an excellent cycle characteristics and an excellent coulombic efficiency can be realized as the osmotic pressure difference is 50% or lower.

A secondary battery is provided by at least one of the embodiments and examples described above. The secondary battery includes a positive electrode, a first aqueous electrolyte held on and in the positive electrode, a negative electrode, a second aqueous electrolyte held on and in the negative electrode, and a separator interposed between the positive electrode and the negative electrode. A difference between an osmotic pressure of the first aqueous electrolyte and an osmotic pressure of the second aqueous electrolyte is 90% or less of the higher one of the osmotic pressure of the first aqueous electrolyte and the osmotic pressure of the second aqueous electrolyte. As a result, it is possible to provide a secondary battery having an excellent storage performance and excellent cycle characteristics.

While certain embodiments have been described, these embodiments have been presented by way of example only, and are not intended to limit the scope of the inventions. Indeed, the novel embodiments may be embodied in a variety of other forms; furthermore, various omissions, substitutions, and changes in the form of the embodiments may be made without departing from the spirit of the inventions. The accompanying claims and their equivalents are intended to cover such embodiments or modifications as would fall within the scope and spirit of the inventions.

What is claimed is:

1. A secondary battery comprising:
a positive electrode;
a first aqueous electrolyte held on the positive electrode;
a negative electrode;
a second aqueous electrolyte held on the negative electrode; and
a separator interposed between the positive electrode and the negative electrode,
wherein a difference between an osmotic pressure (N/m$^2$) of the first aqueous electrolyte and an osmotic pressure (N/m$^2$) of the second aqueous electrolyte is 90% or less (including 0%) of the higher one of the osmotic pressure of the first aqueous electrolyte and the osmotic pressure of the second aqueous electrolyte.

2. The secondary battery according to claim 1, wherein the difference between the osmotic pressure of the first aqueous electrolyte and the osmotic pressure of the second aqueous electrolyte is 80% or less of the higher one of the osmotic pressure of the first aqueous electrolyte and the osmotic pressure of the second aqueous electrolyte.

3. The secondary battery according to claim 1, wherein the difference between the osmotic pressure of the first aqueous electrolyte and the osmotic pressure of the second aqueous electrolyte is 50% or less of the higher one of the osmotic pressure of the first aqueous electrolyte and the osmotic pressure of the second aqueous electrolyte.

4. The secondary battery according to claim 1, wherein at least one of the first aqueous electrolyte and the second aqueous electrolyte contains a compound capable of regulating an osmotic pressure.

5. The secondary battery according to claim 4, wherein the compound capable of regulating the osmotic pressure contains at least one of an inorganic compound, an organic compound, and a surfactant.

6. The secondary battery according to claim 1, wherein a gas permeability of the separator is $1\times10^{-14}$ m$^2$ or less.

7. The secondary battery according to claim 1, wherein an interfacial tension that is the higher one of an interfacial tension of the first aqueous electrolyte and an interfacial tension of the second aqueous electrolyte is 50 mN/m or less.

8. The secondary battery according to claim 1, wherein a negative electrode active material included in the negative electrode is at least one selected from the group consisting of titanium oxide, lithium titanium oxide, and lithium titanium composite oxide.

9. A battery pack comprising the secondary battery according to claim 1.

10. The battery pack according to claim 9, further comprising:
a conductive external terminal; and
a protective circuit.

11. The battery pack according to claim 9, wherein the battery pack includes a plurality of the secondary batteries, and the secondary batteries are electrically connected in series, in parallel, or in a combination of a series connection and a parallel connection.

12. A vehicle comprising the battery pack according to claim 9.

13. A stationary power supply comprising the battery pack according to claim 9.

* * * * *